United States Patent
Chang et al.

(10) Patent No.: US 8,817,212 B2
(45) Date of Patent: Aug. 26, 2014

(54) LIQUID CRYSTAL DISPLAY PANEL

(75) Inventors: Haksun Chang, Yongin-si (KR); YongHwan Shin, Yongin-si (KR); Min-Sik Jung, Seoul (KR); Kyoungju Shin, Hwaseong-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 352 days.

(21) Appl. No.: 13/306,044

(22) Filed: Nov. 29, 2011

(65) Prior Publication Data
US 2012/0154727 A1 Jun. 21, 2012

(30) Foreign Application Priority Data
Dec. 15, 2010 (KR) .................. 10-2010-0128411

(51) Int. Cl.
*G02F 1/1337* (2006.01)
*G02F 1/1343* (2006.01)

(52) U.S. Cl.
USPC .......................................... 349/129; 349/139

(58) Field of Classification Search
CPC .............. G02F 1/133707; G02F 1/133753; G02F 1/134336; G02F 2001/133757
USPC .................................. 349/129, 139

IPC .................................... G02F 1/133707, 1/33753
See application file for complete search history.

(56) References Cited

U.S. PATENT DOCUMENTS

| 8,279,385 | B2 * | 10/2012 | Kim et al. | 349/129 |
| 8,395,736 | B2 * | 3/2013 | Shin et al. | 349/124 |
| 2009/0002588 | A1 * | 1/2009 | Lee et al. | 349/42 |
| 2012/0281174 | A1 * | 11/2012 | Yeh et al. | 349/129 |

* cited by examiner

*Primary Examiner* — Dung Nguyen
(74) *Attorney, Agent, or Firm* — F. Chau & Associates, LLC

(57) ABSTRACT

A liquid crystal display panel including pixels, wherein at least one of the pixels includes a first sub-pixel charged with a first voltage and a second sub-pixel charged with a second voltage lower than the first voltage, a first substrate including a first sub-pixel electrode of the first sub-pixel and a second sub-pixel electrode of the second sub-pixel, a first alignment layer aligned in first and second directions in each of the first and second sub-pixels, a second alignment layer aligned in third and fourth directions in each of the first and second sub-pixels to form a plurality of domains in each of the first and second sub-pixels, and a liquid crystal layer disposed between the first and second alignment layers, wherein the first sub-pixel electrode includes a plurality of slits formed substantially parallel to a liquid crystal alignment direction in each of the domains of the first sub-pixel electrode.

19 Claims, 18 Drawing Sheets

Fig. 4A
Fig. 4B
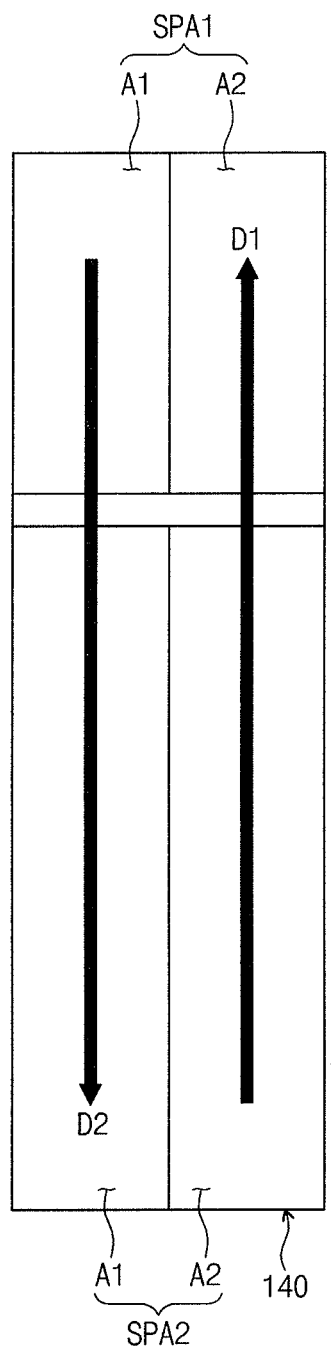
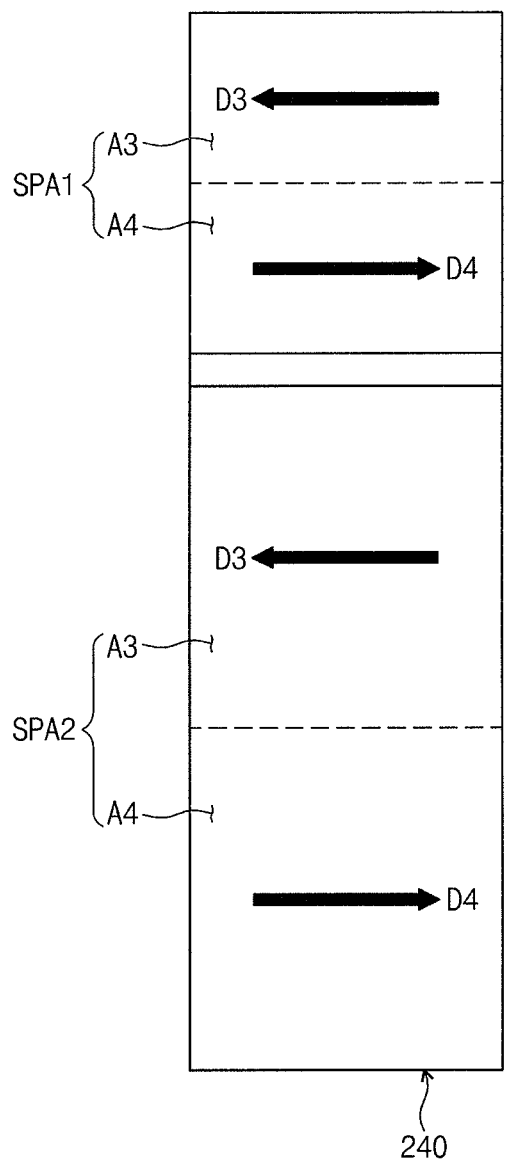

Fig. 5B
Fig. 5C
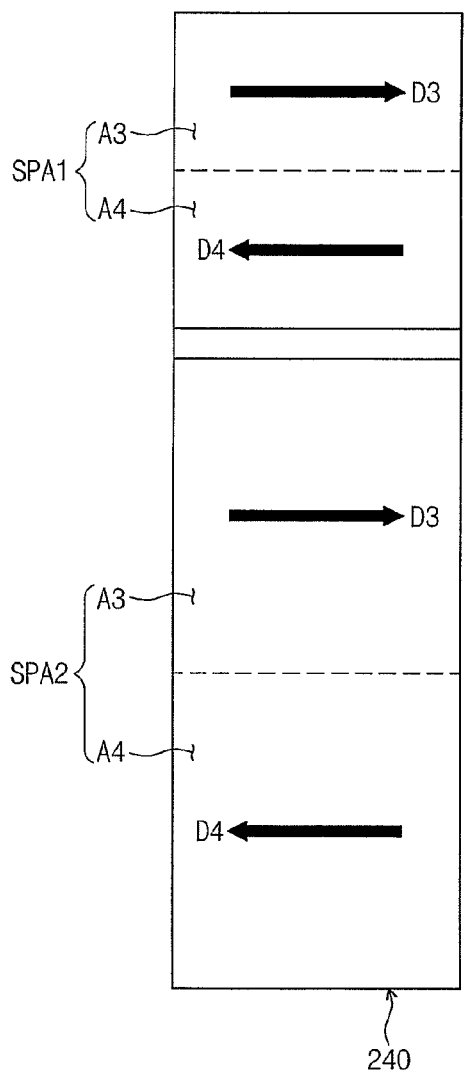
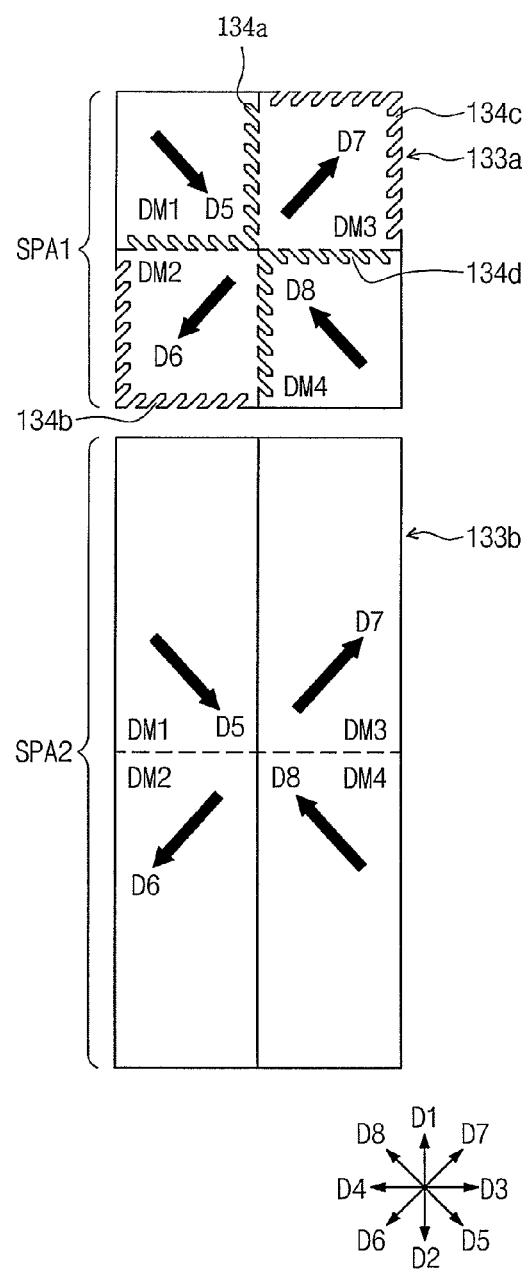

LIQUID CRYSTAL DISPLAY PANEL

CROSS-REFERENCE TO RELATED APPLICATION

This application claims priority to Korean Patent Application No. 10-2010-0128411 filed on Dec. 15, 2010, the disclosure of which is incorporated by reference herein in its entirety.

BACKGROUND

1. Technical Field

The present invention relates to a liquid crystal display panel. More particularly, the present invention relates to a liquid crystal display panel that has improved side visibility and pixel response speed.

2. Discussion of the Related Art

In general, in a liquid crystal display, a voltage is applied to a liquid crystal layer to control a transmittance of light passing through the liquid crystal layer, thereby displaying a desired image. The liquid crystal display may be classified as a twisted nematic type liquid crystal display, a horizontal electric field type liquid crystal display, or a vertical alignment type liquid crystal display.

The vertical alignment type liquid crystal display aligns liquid crystal molecules such that their long axes are perpendicular to a display screen of the vertical alignment type liquid crystal display in the absence of an electric field.

The liquid crystal molecules are aligned by using alignment films manufactured with a rubbing method or a light alignment method. However, liquid crystal molecules between such alignment films are subject to misalignments in a no electric field state. These misalignments may lessen the side viewing angle and degrade the pixel response speed of the vertical alignment type liquid crystal display. Accordingly, there is a need for a liquid crystal display with improved side visibility and pixel response speed.

SUMMARY

According to an exemplary embodiment of the present invention, a liquid crystal display panel includes a plurality of pixels, wherein at least one of the pixels includes a first sub-pixel charged with a first voltage and a second sub-pixel charged with a second voltage lower than the first voltage. The liquid crystal display panel includes a first substrate including a first sub-pixel electrode of the first sub-pixel and a second sub-pixel electrode of the second sub-pixel. The liquid crystal display panel includes a first alignment layer disposed on the first substrate and aligned in a first direction and a second direction in each of the first and second sub-pixels, a second substrate facing the first substrate, a second alignment layer disposed on the second substrate and aligned in a third direction and a fourth direction in each of the first and second sub-pixels to form a plurality of domains in each of the first and second sub-pixels, and a liquid crystal layer disposed between the first alignment layer and the second alignment layer.

The first sub-pixel electrode includes a plurality of slits formed substantially parallel to a liquid crystal alignment direction in each of the domains of the first sub-pixel electrode.

The pixels comprise first pixel displaying a red color, a second pixel displaying a green color, and a third pixel displaying a blue color, and the at least one pixel is the third pixel.

Each of the first and second sub-pixel electrodes comprises first, second, third, and fourth domains and the liquid crystal alignment directions of the first to fourth domains of the first sub-pixel electrode are different from each other, and a liquid crystal alignment direction in each of the first to fourth domains of the second sub-pixel electrode are different from each other.

The slits comprise first, second, third, and fourth slits respectively corresponding to the first, second, third, and fourth domains of the first sub-pixel electrode, and each of the slits is formed substantially parallel to the liquid crystal alignment direction of its corresponding domain.

The first sub-pixel electrode comprises a first fringe field area formed along edges of the first domain and having an L shape, a second fringe field area formed along edges of the second domain and having an L shape that is rotated 90 degrees in the counter-clockwise direction from the position of the L shape in the first domain, a third fringe field area formed along edges of the third domain and having an L shape rotated 90 degrees in the clockwise direction from the position of the L shape in the first domain, and a fourth fringe area formed along edges of the fourth domain and having an L shape rotated 180 degrees in the counter-clockwise direction from the position of the L shape in the first domain.

The first, second, third, and fourth slits are provided in the first, second, third, and fourth fringe field areas, respectively.

The first sub-pixel electrode comprises a first fringe field area formed along an edge of the first domain, a second fringe field area formed along an edge of the second domain, a third fringe field area formed along an edge of the third domain, and a fourth fringe field area formed along an edge of the fourth domain, and the first, second, third, and fourth slits are formed along the edges of the first sub-pixel electrode except where the first, second, third, and fourth fringe field areas are formed.

Each of the slits has a length of about 10 percent of a width of the first sub-pixel electrode.

An entire area in which the slits are formed is about 10 percent to about 90 percent of an entire area of the first sub-pixel electrode.

The first and second pixels each include a first sub-pixel charged with the first voltage and a second sub-pixel charged with the second voltage, and a voltage ratio of the second voltage to the first voltage in the third pixel is equal to or different from a voltage ratio of the second voltage to the first voltage in each of the first and second pixels.

The voltage ratio of the second voltage to the first voltage in the third pixel is larger than the voltage ratio of the second voltage to the first voltage in the second pixel, and the voltage ratio of the second voltage to the first voltage in the first pixel is equal to or smaller than the voltage ratio of the second voltage to the first voltage in the second pixel.

The voltage ratio of the second voltage to the first voltage in the first pixel is about 0.59 to about 0.845, the voltage ratio of the second voltage to the first voltage in the second pixel is about 0.6 to about 0.85, the voltage ratio of the second voltage to the first voltage in the third pixel is about 0.61 to about 0.9.

The first and second pixels each include first and second sub-pixel electrodes disposed on the first substrate, and the first sub-pixel electrode of each of the first, second, and third pixels has a size different from a size of the second sub-pixel electrode of each of the first, second, and third pixels, respectively, and an area ratio of the second sub-pixel electrode to the first sub-pixel electrode is equal to or different from an area ratio of the second sub-pixel electrode to the first sub-pixel electrode in each of the first and second pixels.

The area ratio of the second sub-pixel electrode to the first sub-pixel electrode in the third pixel is larger than the area ratio of the second sub-pixel electrode to the first sub-pixel electrode in the second pixel.

The area ratio of the second sub-pixel electrode to the first sub-pixel electrode in the third pixel is about 1:1.1 to about 1:3.5, and the area ratio of the second sub-pixel electrode to the first sub-pixel electrode in the second pixel is about 1:1 to about 1:2.5.

Each of the first alignment layer and the second alignment layer comprises a polymer material in which decomposition, dimerization, or isomerization occurs when irradiated by a light.

According to an exemplary embodiment of the present invention, a liquid crystal display panel includes a plurality of pixels, wherein at least one of the pixels includes a first sub-pixel charged with a first voltage and a second sub-pixel charged with a second voltage lower than the first voltage. The liquid crystal display panel includes a first substrate including a first sub-pixel electrode of the first sub-pixel and a second sub-pixel electrode of the second sub-pixel, a second substrate facing the first substrate, and a liquid crystal layer disposed between the first substrate and the second substrate.

Each of the first sub-pixel electrode and the second sub-pixel electrode includes at least two domains having different liquid crystal alignment directions, and the first sub-pixel electrode includes a plurality of slits in at least one of its domains. The slits are formed substantially parallel to the liquid crystal alignment direction of the domain in which it is formed.

The pixels comprise a first pixel displaying a red color, a second pixel displaying a green color, and a third pixel displaying a blue color, and the at least one pixel is the third pixel.

The first and second pixels each include a first sub-pixel charged with the first voltage and a second sub-pixel charged with the second voltage, and the voltage ratio of the second voltage to the first voltage in the third pixel is larger than the voltage ratio of the second voltage to the first voltage in the second pixel, and the voltage ratio of the second voltage to the first voltage in the first pixel is equal to or smaller than the voltage ratio of the second voltage to the first voltage in the second pixel.

The first and second pixels each include first and second sub-pixel electrodes disposed on the first substrate, and the area ratio of the second sub-pixel electrode to the first sub-pixel electrode in the third pixel is larger than the area ratio of the second sub-pixel electrode to the first sub-pixel electrode in the second pixel.

According to an exemplary embodiment of the present invention, a liquid crystal display panel, comprises: a plurality of pixels, wherein the plurality of pixels include first and second pixels displaying a different color from each other, each of the first and second pixels including a first sub-pixel and a second sub-pixel, and each of the first and second sub-pixels includes a plurality of domains, the domains having a different liquid crystal alignment direction from each other, wherein the first sub-pixel of the first pixel includes a first sub-pixel electrode having a plurality of slits disposed along an edge of the first sub-pixel electrode.

A voltage ratio of a voltage applied to a second sub-pixel electrode of the first pixel and a voltage applied to the first sub-pixel electrode of the first pixel is greater than a voltage ratio of a voltage applied to a second sub-pixel electrode of the second pixel and a voltage applied to a first sub-pixel electrode of the second pixel.

An area ratio of a second sub-pixel electrode of the first pixel to the first sub-pixel electrode of the first pixel is greater than an area ratio of a second sub-pixel electrode of the second pixel to a first sub-pixel electrode of the second pixel.

BRIEF DESCRIPTION OF THE DRAWINGS

The above and other features of the present invention will become more apparent by describing in detail exemplary embodiments thereof with reference to the accompanying drawings in which:

FIG. 4A is a plan view showing alignment directions of a first alignment layer according to an exemplary embodiment of the present invention;

FIG. 4B is a plan view showing alignment directions of a second alignment layer according to an exemplary embodiment of the present invention;

FIG. 5B is a plan view showing alignment directions of a second alignment layer according to an exemplary embodiment of the present invention;

FIG. 5C is a plan view showing a first sub-pixel and a second sub-pixel according to an exemplary embodiment of the present invention;

DETAILED DESCRIPTION OF EXEMPLARY EMBODIMENTS

Exemplary embodiments of the present invention will be described more fully hereinafter with reference to the accompanying drawings. However, the present invention may be embodied in various different ways and should not be construed as limited to the exemplary embodiments described herein.

It will be understood that when an element or layer is referred to as being "on," "connected to" or "coupled to" another element or layer, it can be directly on, connected or coupled to the other element or layer or intervening elements or layers may be present. Like numbers may refer to like elements throughout the specification and drawings.

Figure 1:
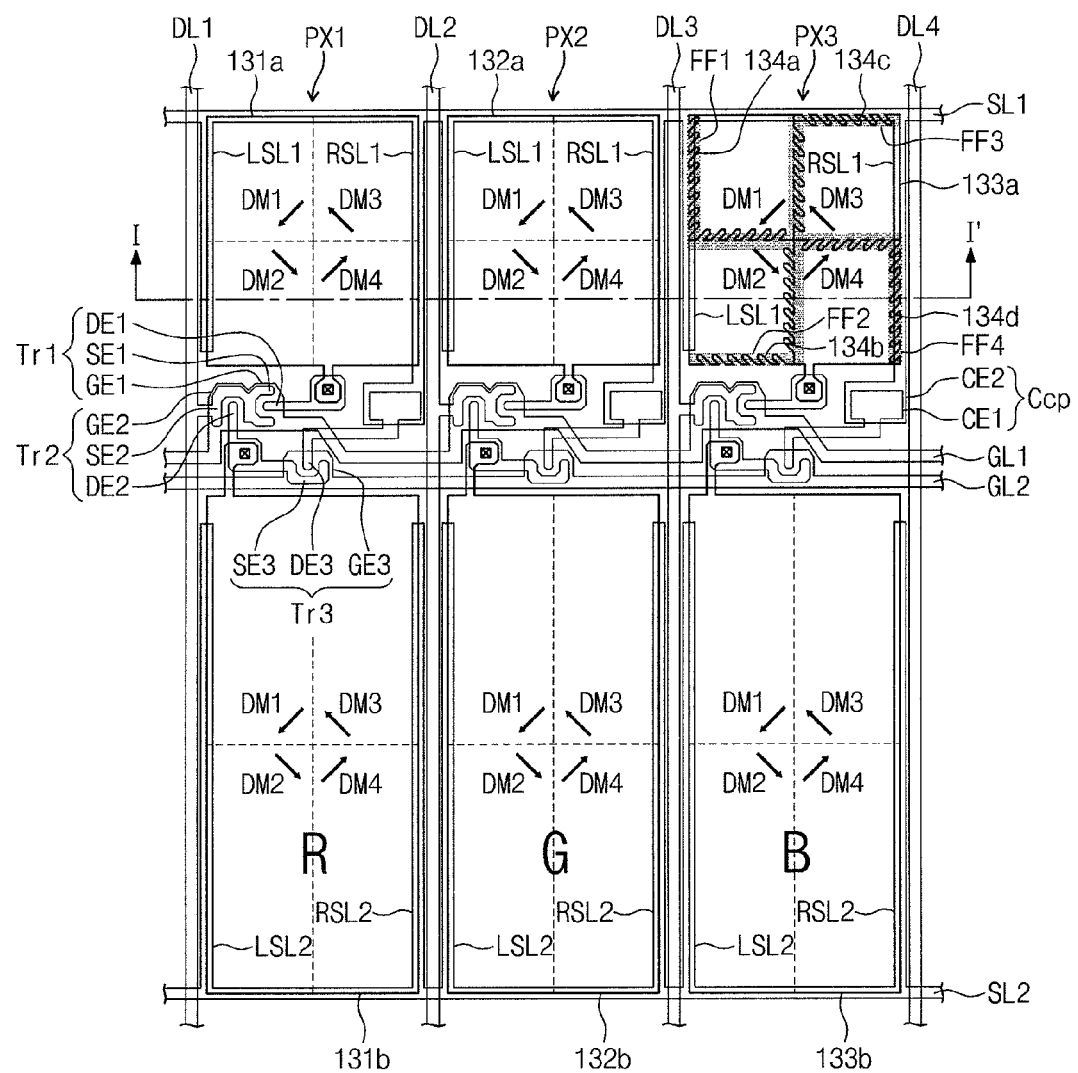
FIG. 1 is a plan view showing a pixel part of a liquid crystal display panel according to an exemplary embodiment of the present invention.
Figure 2:
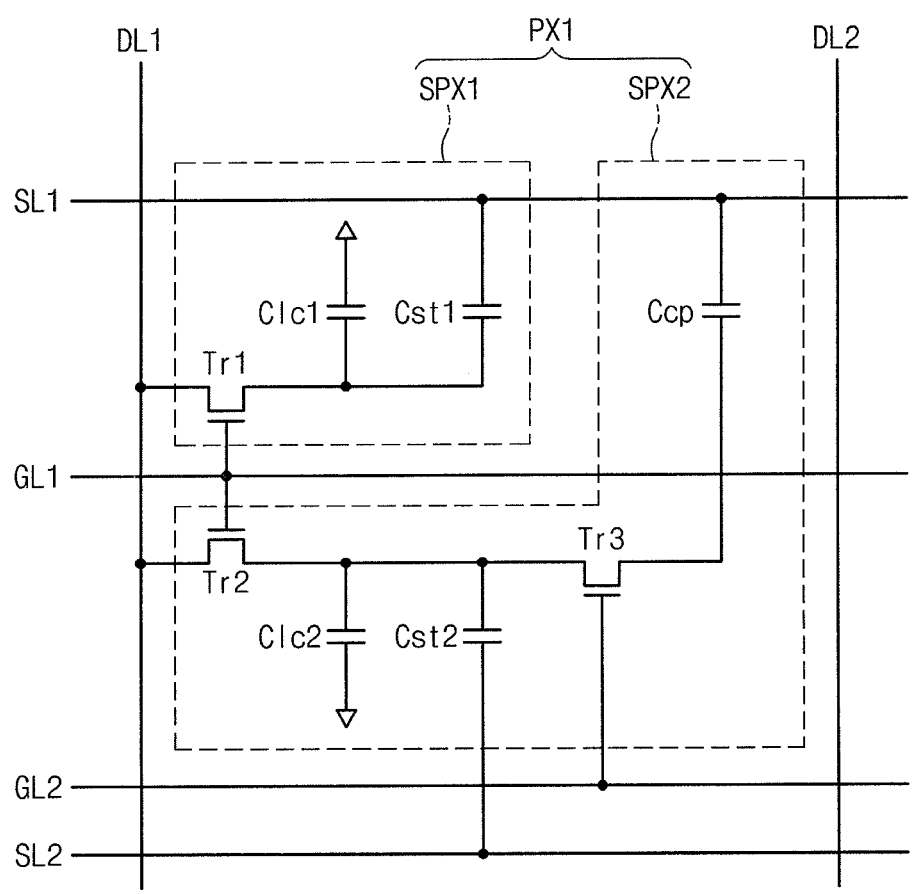
FIG. 2 is an equivalent circuit diagram showing a first sub-pixel and a second sub-pixel of FIG. 1, according to an exemplary embodiment of the present invention.

FIG. 1 is a plan view showing a pixel part of a liquid crystal display panel according to an exemplary embodiment of the present invention, and FIG. 2 is an equivalent circuit diagram showing a first sub-pixel and a second sub-pixel of FIG. 1, according to an exemplary embodiment of the present invention.

Referring to FIG. 1, a liquid crystal display panel 400 includes a plurality of pixel parts and each pixel part includes two or more pixels that display different colors from each other. In the present exemplary embodiment shown in FIG. 1, each pixel part includes a first pixel PX1, a second pixel PX2, and a third pixel PX3, which display a red color R, a green color G, and a blue color B, respectively. Although not shown in FIG. 1, the pixel parts are arranged in a matrix.

The liquid crystal display panel 400 includes a plurality of gate lines and a plurality of data lines. In FIG. 1, gate lines and data lines that are related to the first, second, and third pixels PX1, PX2, and PX3 are shown. In detail, as shown in FIG. 1, the liquid crystal display panel 400 includes first to fourth data lines DL1, DL2, DL3, and DL4 that are substantially parallel to each other and first and second gate lines GL1 and GL2 that are insulated from the first to fourth data lines DL1 to DL4 while crossing the first to fourth data lines DL1 to DL4.

In addition, the liquid crystal display panel 400 further includes a first storage line SL1, a second storage line SL2 substantially parallel to the first storage line SL1, first and second branch electrodes LSL1 and RSL1 branched from the first storage line SL1, and third and fourth branch electrodes LSL2 and RSL2 branched from the second storage line SL2.

Each of the first, second, and third pixels PX1, PX2, and PX3 includes a first sub-pixel and a second sub-pixel. Since the first, second, and third pixels PX1, PX2, and PX3 have a similar structure and function, the first pixel PX1 will be described in detail as a representative pixel, and details of the second and third pixels PX2 and PX3 will be omitted to avoid redundancy.

In addition, FIG. 2 shows the equivalent circuit configuration corresponding to the first pixel PX1, but each of the second and third pixels PX2 and PX3 has the same circuit configuration as the first pixel PX1.

Referring to FIGS. 1 and 2, the first pixel PX1 includes a first sub-pixel SPX1 and a second sub-pixel SPX2. The first sub-pixel SPX1 includes a first thin film transistor Tr1 and a first sub-pixel electrode 131a, and the second sub-pixel SPX2 includes a second thin film transistor Tr2, a second sub-pixel electrode 131b, a third thin film transistor Tr3, and a coupling capacitor Ccp. The first and second sub-pixels SPX1 and SPX2 are disposed between the first and second data lines DL1 and DL2 that are adjacent to each other.

The first thin film transistor Tr1 is connected to the first data line DL1 and the first gate line GL1, and the second thin film transistor Tr2 is connected to the first data line DL1 and the first gate line GL1. In detail, the first thin film transistor Tr1 includes a first source electrode SE1 connected to the first data line DL1, a first gate electrode GE1 connected to the first gate line GL1, and a first drain electrode DE1 connected to the first sub-pixel electrode 131a. The first sub-pixel electrode 131a faces a common electrode (not shown) while interposing a liquid crystal layer (not shown) therebetween to form a first liquid crystal capacitor Clc1. In addition, the first sub-pixel electrode 131a overlaps with the first storage line SL1 and first and second branch electrodes LSL1 and RSL1 to form a first storage capacitor Cst1. Accordingly, the first storage capacitor Cst1 may be connected to the first liquid crystal capacitor Clc1 in parallel.

The second thin film transistor Tr2 includes a second source electrode SE2 connected to the first data line DL1, a second gate electrode GE2 connected to the first gate line GL1, and a second drain electrode DE2 connected to the second sub-pixel electrode 131b. The second sub-pixel electrode 131b faces the common electrode while interposing the liquid crystal layer therebetween to form a second liquid crystal capacitor Clc2. In addition, the second sub-pixel electrode 131b overlaps with the second storage line SL2, and the third and fourth branch electrodes LSL2 and RSL2 to form a second storage capacitor Cst2. Thus, the second storage capacitor Cst2 may be connected to the second liquid crystal capacitor Clc2 in parallel.

When a first gate signal is applied to the first gate line GL1, the first and second thin film transistors Tr1 and Tr2 are substantially simultaneously turned on. The data voltage applied to the first data line DL1 is applied to the first and second sub-pixel electrodes 131a and 131b through the turned-on first and second thin film transistors Tr1 and Tr2. Accordingly, during a high period of the first gate signal, the first and second liquid crystal capacitors Clc1 and Clc2 are charged with the same pixel voltage.

Further, the third thin film transistor Tr3 includes a third source electrode SE3 connected to the second drain electrode DE2 of the second thin film transistor Tr2, a third gate electrode GE3 connected to the second gate line GL2, and a third drain electrode DE3 connected to the coupling capacitor Ccp. In the present exemplary embodiment, the coupling capacitor Ccp may include a first electrode CE1 extending from the third drain electrode DE3 and a second electrode CE2 extending from the second branch electrode RSL1 to face the first electrode CE1 while interposing an insulating layer (not shown) between the first and second electrodes CE1 and CE2, but the present invention is not limited thereto.

The second gate line GL2 receives a second gate signal that rises after the fall transition of the first gate signal. When the third thin film transistor Tr3 is turned on in response to the second gate signal, a voltage division occurs between the second liquid crystal capacitor Clc2 and the coupling capacitor Ccp, thereby lowering the pixel voltage charged in the second liquid crystal capacitor Clc2. The lowering in level of the pixel voltage may be varied depending upon the rate of charge of the coupling capacitor Ccp.

Consequently, after the second gate signal is generated, the first liquid crystal capacitor Clc1 may be charged with a first pixel voltage and the second liquid crystal capacitor Clc2 may be charged with a second pixel voltage lower than the first pixel voltage.

As shown in FIG. 1, the second pixel PX2 includes a first sub-pixel electrode 132a and a second sub-pixel electrode 132b, and the third pixel PX3 includes a first sub-pixel electrode 133a and a second sub-pixel electrode 133b.

In the present exemplary embodiment, a voltage ratio of the second pixel voltage to the first pixel voltage in the third pixel PX3 may be the same as a voltage ratio of the second pixel voltage to the first pixel voltage in each of the first and second pixels PX1 and PX2.

In addition, an area ratio of the second sub-pixel electrode 133b to the first sub-pixel electrode 133a in the third pixel PX3 may be the same as an area ratio of the second sub-pixel electrode 131b and 132b to the first sub-pixel electrode 131a and 132a in each of the first and second pixels PX1 and PX2.

Each of the first sub-pixel electrodes 131a, 132a, and 133a is divided into first to fourth domains DM1 to DM4 having liquid crystal alignment directions different from each other. In the present exemplary embodiment, the liquid crystal alignment directions of the first to fourth domains DM1 to DM4 are in a counter-clockwise direction. In addition, each of the second sub-pixel electrodes 131b, 132b, and 133b is divided into first to fourth domains DM1 to DM4 having liquid crystal alignment directions different from each other. In the present exemplary embodiment, the liquid crystal alignment directions in the first to fourth domains DM1 to DM4 of the second sub-pixel electrodes 131b, 132b, and 133b are in the counter-clockwise direction.

The liquid crystal alignment directions of the first to fourth domains DM1 to DM4 will be described in detail with reference to FIGS. 4A to 4C and 5A to 5C.

Further, the first sub-pixel electrode of at least one pixel of the first to third pixels PX1, PX2, and PX3 of the pixel part is provided with a plurality of slits 134a, 134b, 134c, and 134d. As an example, the slits 134a, 134b, 134c, and 134d may be provided to the first sub-pixel electrode 133a included in the third pixel PX3 that displays the blue color. The slits 134a, 134b, 134c, and 134d include first, second, third, and fourth slits 134a, 134b, 134c, and 134d respectively corresponding to the first, second, third, and fourth domains DM1, DM2, DM3, and DM4, and each of the first to fourth slits 134a, 134b, 134c, and 134d is formed substantially parallel to the liquid crystal alignment direction of the corresponding domain. The slits may also be formed in other arrangements, for example, substantially perpendicular, with respect to the liquid crystal alignment direction of their corresponding domains.

In the case that the liquid crystal alignment directions of the first to fourth domains DM1 to DM4 are in the counter-clockwise direction, first, second, third and fourth fringe fields FF1, FF2, FF3, and FF4 are formed in the first sub-pixel electrode 133a.

The first fringe field area FF1 is formed along an end of the first domain DM1 and has an L shape, and the second fringe field area FF2 is formed along an end of the second domain DM2 and has an L shape rotated 90 degrees in the counter-clockwise direction with respect to the position of the L shape in the first domain DM1. The fringe field area FF3 is formed along an end of the third domain DM3 and has an L shape rotated 90 degrees in the clockwise direction with respect to the position of the L shape in the first domain DM1. The fourth fringe area FF4 is formed along an end of the fourth domain DM4 and has an L shape rotated 180 degrees in the counter-clockwise direction with respect to the position of the L shape in the first domain DM1. In the present exemplary embodiment, the first to fourth fringe field areas FF1 to FF4 may be areas in which the liquid crystal molecules are misaligned due to the liquid crystal alignment directions colliding.

The first slits 134a are provided in the first fringe field area FF1. Particularly, the first slits 134a are formed by cutting the first sub-pixel electrode 133a from a side of the first sub-pixel electrode 133a inward to the first domain DM1 such that the first slits 134a are formed substantially parallel to the liquid crystal alignment direction of the first domain DM1. The second slits 134b are provided in the second fringe field area FF2. Particularly, the second slits 134b are formed by cutting the first sub-pixel electrode 133a from a side of the first sub-pixel electrode 133a inward to the second domain DM2 such that the second slits 134b are formed substantially parallel to the liquid crystal alignment direction of the second domain DM2.

The third slits 134c are provided in the third fringe field area FF3. Particularly, the third slits 134c are formed by cutting the first sub-pixel electrode 133a from a side of the first sub-pixel electrode 133a inward to the third domain DM3 such that the third slits 134c are formed substantially parallel to the liquid crystal alignment direction of the third domain DM3. The fourth slits 134d are provided in the fourth fringe field area FF4. Particularly, the fourth slits 134d are formed by cutting the first sub-pixel electrode 133a from a side of the first sub-pixel electrode 133a inward to the fourth domain DM4 such that the fourth slits 134d are formed substantially parallel to the liquid crystal alignment direction of the fourth domain DM4.

In the present exemplary embodiment, each of the first to fourth slits 134a to 134d may have a length corresponding to approximately 10 percent of a width of the first sub-pixel electrode 133a. In addition, the entire area in which the first to fourth slits 134a to 134d are formed corresponds to about 10 percent to about 90 percent of the entire area of the first sub-pixel electrode 133a.

Figure 3:
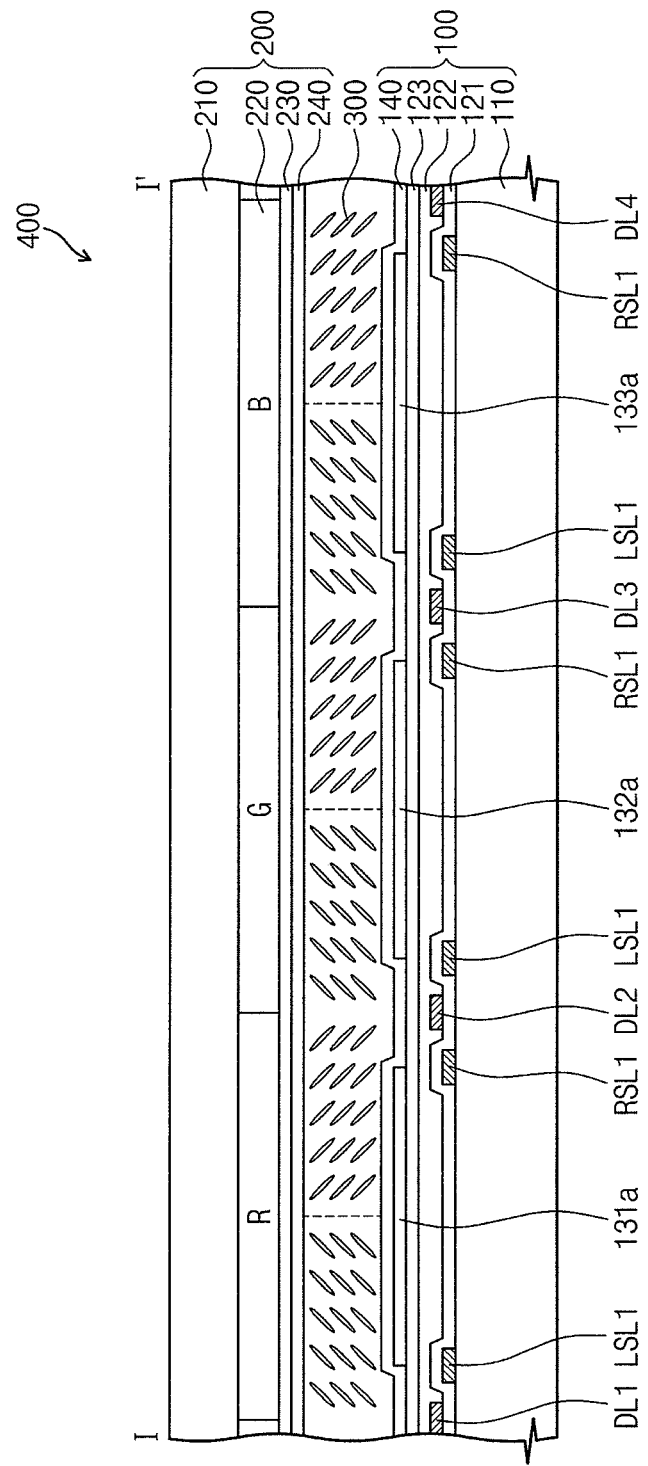
FIG. 3 is a cross-sectional view taken along a line It of FIG. 1.

FIG. 3 is a cross-sectional view taken along a line I-I' of FIG. 1.

Referring to FIG. 3, the liquid crystal display panel 400 includes an array substrate 100, an opposite substrate 200 facing the array substrate 100, and a liquid crystal layer 300 disposed between the array substrate 100 and the opposite substrate 200.

The array substrate 100 includes a first base substrate 110 that is a transparent insulating substrate. The first base substrate 110 includes a gate line part including the first and second gate lines GL1 and GL2, the first and second storage lines SL1 and SL2, and the first to fourth branch electrodes LSL1, RSL1, LSL2, and RSL2.

The array substrate 100 includes a gate insulating layer 121 that covers the gate line part, and a data line part including the first to fourth data lines DL1 to DL4 is disposed on the gate insulating layer 121. The data line part is covered by a protective layer 122 and an organic insulating layer 123 is disposed on the protective layer 122.

The first sub-pixel electrodes 131a, 132a, and 133a and the second sub-pixel electrodes 131b, 132b, and 133b are disposed on the organic insulating layer 123.

The array substrate 100 further includes a first alignment layer 140 to cover the first sub-pixel electrodes 131a, 132a, and 133a and the second sub-pixel electrodes 131b, 132b, and 133b. The first alignment layer 140 may include a polymer material in which decomposition, dimerization, or isomerization occurs when irradiated by light such as an ultraviolet ray or a laser. In addition, the first alignment layer 140 may be formed by blending an oligomer cinnamate and a polymer-based cinnamate.

The opposite substrate 200 includes a second base substrate 210 facing the first base substrate 110. The second base substrate 210 includes a color filter layer 220 including red, green, and blue color pixels R, G, and B thereon. The red, green, and blue color pixels R, G, and B correspond to the first, second, and third pixels PX1, PX2, and PX3, respectively.

The common electrode 230 is disposed on the color filter layer 220. The common electrode 230 faces the first sub-pixel electrodes 131a, 132a, and 133a to form the first liquid crystal capacitor Clc1. Although not shown in FIGS. 1 and 2, the common electrode 230 faces the second sub-pixel electrodes 131b, 132b, and 133b to form the second liquid crystal capacitor Clc2.

The opposite substrate 200 further includes a second alignment layer 240 to cover the common electrode 230. The second alignment layer 240 may include a polymer material in which decomposition, dimerization, or isomerization occurs when irradiated by light such as an ultraviolet ray or laser. In addition, the second alignment layer 240 may be formed by blending an oligomer cinnamate and a polymer-based cinnamate.

Figure 4C:
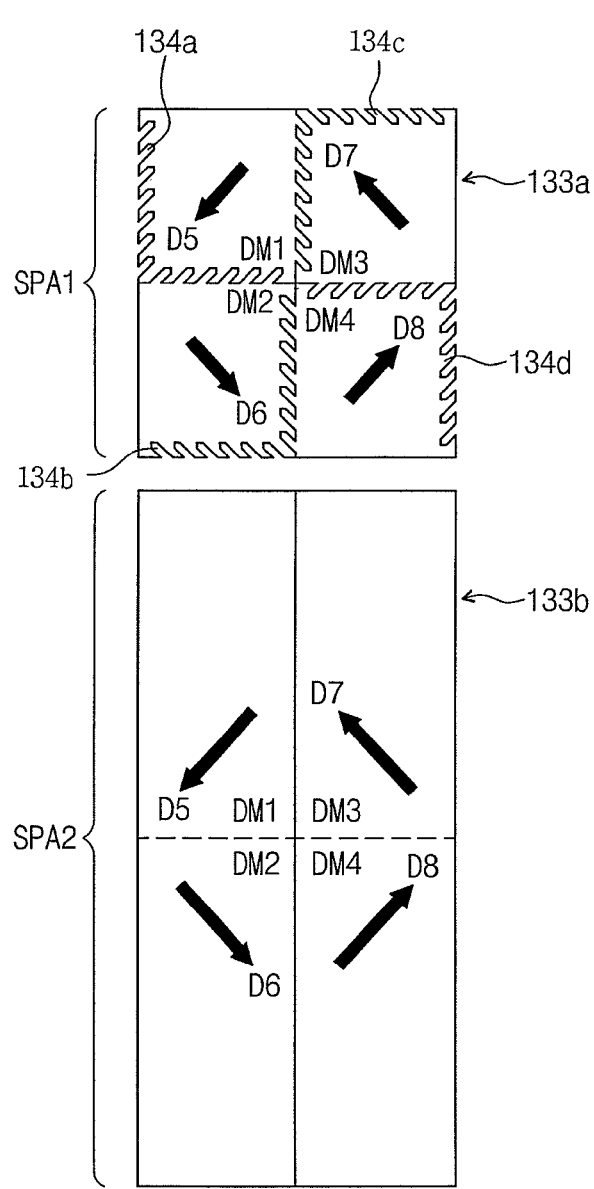
FIG. 4C is a plan view showing a first sub-pixel and a second sub-pixel according to an exemplary embodiment of the present invention.

FIG. 4A is a plan view showing alignment directions of a first alignment layer according to an exemplary embodiment of the present invention, FIG. 4B is a plan view showing alignment directions of a second alignment layer according to an exemplary embodiment of the present invention, and FIG. 4C is a plan view showing a first sub-pixel and a second sub-pixel according to an exemplary embodiment of the present invention.

Referring to FIG. 4A, the first alignment layer 140 is divided into a first sub-pixel area SPA1 and a second sub-pixel area SPA2 to correspond to the third pixel PX3. In addition, each of the first and second sub-pixel areas SPA1 and SPA2 includes a first area A1 and a second area A2 arranged in a direction vertical to a first direction D1. The first area A1 is light-aligned in the first direction D1 and the second area A2 is light-aligned in a second direction D2 opposite to the first direction D1. The first alignment layer 140 may be further divided into additional sub-pixel areas which may be light-aligned in the first or second directions or some other direction, thus generating more domains.

The alignment direction of the first alignment layer 140 may be determined by irradiating an ultraviolet ray having two or more polarizing directions onto the first alignment layer 140 or by inclinedly irradiating light onto the first alignment layer 140 with respect to a surface of the first alignment layer 140.

Hereinafter, the method of inclinedly irradiating the light onto the first alignment layer 140 will be described.

A mask through which an opening is formed is disposed on the first alignment layer 140. When the mask is disposed such that the opening corresponds to the first area A1, the light is inclinedly irradiated onto the first area A1 of the first alignment layer 140 to perform a first exposure process on the first area A1 of the first alignment layer 140. During the first exposure process, an exposure apparatus (not shown) emitting the light may irradiate the light onto the first area A1 while being moved in the first direction D1.

The method of inclinedly irradiating the light onto the first alignment layer 140 may be performed by inclining the first base substrate 110 or the exposure apparatus.

Then, after the mask is shifted such that the opening corresponds to the second area A2, the light is inclinedly irradiated onto the second area A2 of the first alignment layer 140 to perform a second exposure process on the second area A2 of the first alignment layer 140. Particularly, during the second exposure process, the exposure apparatus irradiates the light onto the second area A2 while being moved in the second direction D2 opposite to the first direction D1. When the exposure processes are completely finished, a pretilt angle is formed to be inclined toward the first direction D1 in the first area A1 of the first alignment layer 140, and a pretilt angle is formed to be inclined toward the second direction D2 in the second area A2 of the first alignment layer 140. For instance, the pretilt angle may be in a range of about 85 degrees to about 89 degrees. Accordingly, the liquid crystal molecules of the liquid crystal layer 300 may be vertically aligned by the first alignment layer 140 while being inclined by the pretilt angle when no electric field is applied. In the present exemplary embodiment, the size of the pretilt angle depends upon the amount of the irradiated light. In other words, as the amount of irradiated light increases, the size of the pretilt angle increases, and vice versa.

In the present exemplary embodiment, the first alignment layer 140 has been aligned by using a light alignment method capable of accurately controlling the liquid crystal alignment direction, but the present invention is not limited thereto. In other words, the first alignment layer 140 may be aligned by various alignment methods such as a rubbing method or an alignment method which uses a reactive mesogen.

Referring to FIG. 4B, the second alignment layer 240 is divided into a first sub-pixel area SPA1 and a second sub-pixel area SPA2 to correspond to the third pixel PX3. In addition, each of the first and second sub-pixel areas SPA1 and SPA2 includes a third area A3 and a fourth area A4 arranged in the first direction D1. The third area A3 is light-aligned in a third direction D3 vertical to the first direction D1 and the fourth area A4 is light-aligned in a fourth direction D4 opposite to the third direction D3. The second alignment layer 240 may be further divided into additional sub-pixel areas which may be light-aligned in the third or fourth directions or some other direction, thus generating more domains.

Since the second alignment layer 240 is aligned by a method similar to that of the first alignment layer 140, a detailed description thereof will be omitted.

When the array substrate 100 and the opposite substrate 200 are coupled with each other to face each other, as shown in FIG. 4C, the first to fourth domains DM1 to DM4 are formed in the first sub-pixel area SPA1. In detail, the first area A1 overlaps the third area A3 to form the first domain DM1, the first area A1 overlaps the fourth area A4 to form the second domain DM2, the second area A2 overlaps the third area A3 to form the third domain DM3, and the second area A2 overlaps the fourth area A4 to form the fourth domain DM4.

Similar to the above, the first to fourth domains DM1 to DM4 are formed in the second sub-pixel area SPA2.

The liquid crystal molecules in the liquid crystal layer 300 are aligned in different directions from each other in the first to fourth domains DM1 to DM4. In particular, the liquid crystal molecules in the first domain DM1 are aligned in a fifth direction D5 determined by a vector sum of the second direction D2 and the third direction D3, the liquid crystal molecules in the second domain DM2 are aligned in a sixth direction D6 determined by a vector sum of the second direction D2 and the fourth direction D4, the liquid crystal molecules in the third domain DM3 are aligned in a seventh direction D7 determined by a vector sum of the first direction D1 and the third direction D3, and the liquid crystal molecules in the fourth domain DM4 are aligned in an eighth direction D8 determined by a vector sum of the first direction D1 and the fourth direction D4.

Accordingly, the alignment directions of the liquid crystal layer 300 are in the counter-clockwise direction in the first to fourth domains DM1 to DM4. As described above, plural domains DM1 to DM4, e.g., the first to fourth domains, may be formed in each sub-pixel area SPA1 and SPA2, e.g., the first and second sub-pixel areas, thereby widening a viewing angle of the liquid crystal display panel 400.

Further, the first to fourth slits 134a, 134b, 134c, and 134d are formed corresponding to the first to fourth domains DM1 to DM4, respectively. Especially, the first slits 134a are aligned substantially parallel to the fifth direction D5 in the first domain DM1, and the second slits 134b are aligned substantially parallel to the sixth direction D6 in the second domain DM2. The third slits 134c are aligned substantially parallel to the seventh direction D7 in the third domain DM3, and the fourth slits 134d are aligned substantially parallel to the eighth direction D8 in the fourth domain DM4.

Figure 5A:
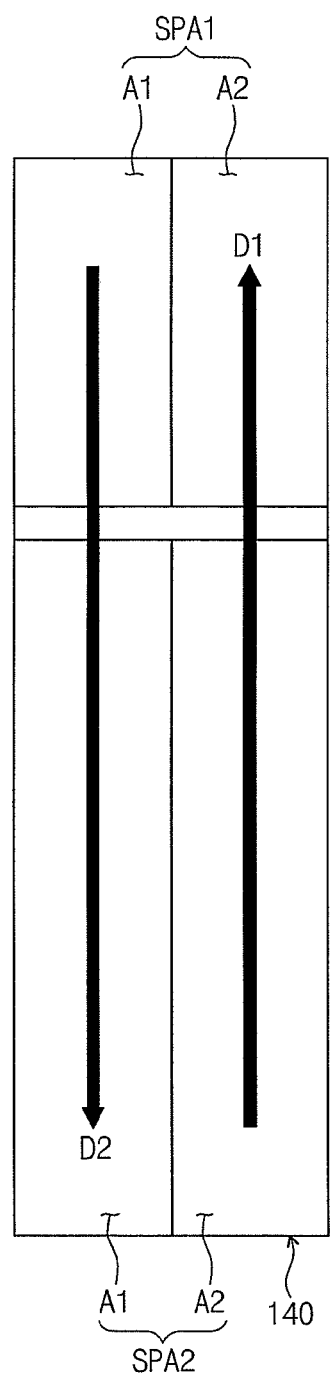
FIG. 5A is a plan view showing alignment directions of a first alignment layer according to an exemplary embodiment of the present invention.
Figure 5A:
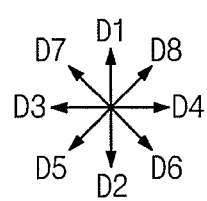

FIG. 5A is a plan view showing alignment directions of a first alignment layer according to an exemplary embodiment of the present invention, FIG. 5B is a plan view showing alignment directions of a second alignment layer according to an exemplary embodiment of the present invention, and FIG. 5C is a plan view showing a first sub-pixel and a second sub-pixel according to an exemplary embodiment of the present invention.

Referring to FIG. 5A, the first alignment layer 140 is divided into the first sub-pixel area SPA1 and the second sub-pixel area SPA2 to correspond to the third pixel PX3. In addition, each of the first and second sub-pixel areas SPA1 and SPA2 includes the first area A1 and the second area A2 arranged in a direction vertical to the first direction D1. The first area A1 is light-aligned in the first direction D1 and the second area A2 is light-aligned in the second direction D2 opposite to the first direction D1.

The light is inclinedly irradiated onto the first area A1 of the first alignment layer 140 to perform the first exposure process on the first area A1 of the first alignment layer 140. Then, the light is inclinedly irradiated onto the second area A2 of the first alignment layer 140 to perform the second exposure process on the second area A2 of the first alignment layer 140. When the exposure processes are completely finished, the pretilt angle is formed to be inclined toward the first direction D1 in the first area A1 of the first alignment layer 140, and the pretilt angle is formed to be inclined toward the second direction D2 in the second area A2 of the first alignment layer 140. Accordingly, the liquid crystal molecules of the liquid crystal layer 300 may be vertically aligned by the first alignment layer 140 while being inclined by the pretilt angle when no electric field is applied.

Referring to FIG. 5B, the second alignment layer 240 is divided into the first sub-pixel area SPA1 and the second sub-pixel area SPA2 to correspond to the third pixel PX3. In addition, each of the first and second sub-pixel areas SPA1 and SPA2 includes the third area A3 and the fourth area A4 arranged in the first direction D1. The third area A3 is light-aligned in the third direction D3 vertical to the first direction D1 and the fourth area A4 is light-aligned in the fourth direction D4 opposite to the third direction D3.

When the array substrate 100 and the opposite substrate 200 are coupled with each other to face each other, as shown in FIG. 5C, the first to fourth domains DM1 to DM4 are formed in the first sub-pixel area SPA1. In detail, the first area A1 overlaps the third area A3 to form the first domain DM1, the first area A1 overlaps the fourth area A4 to form the second domain DM2, the second area A2 overlaps the third area A3 to form the third domain DM3, and the second area A2 overlaps the fourth area A4 to form the fourth domain DM4.

Similar to the above, the first to fourth domains DM1 to DM4 are formed in the second sub-pixel area SPA2.

The liquid crystal molecules in the liquid crystal layer 300 are aligned in different directions from each other in the first to fourth domains DM1 to DM4. Particularly, the liquid crystal molecules in the first domain DM1 are aligned in a fifth direction D5 determined by a vector sum of the second direction D2 and the third direction D3, the liquid crystal molecules in the second domain DM2 are aligned in a sixth direction D6 determined by a vector sum of the second direction D2 and the fourth direction D4, the liquid crystal molecules in the third domain DM3 are aligned in a seventh direction D7 determined by a vector sum of the first direction D1 and the third direction D3, and the liquid crystal molecules in the fourth domain DM4 are aligned in an eighth direction D8 determined by a vector sum of the first direction D1 and the fourth direction D4.

Accordingly, the alignment direction of the liquid crystal layer in the second domain DM2 is opposite to the alignment direction of the liquid crystal layer in the third domain DM3, and the alignment direction of the liquid crystal layer in the first domain DM1 is opposite to the alignment direction of the liquid crystal layer in the fourth domain DM4. As described above, plural domains DM1 to DM4 having different alignment directions may be formed in each sub-pixel area SPA1 and SPA2, to thereby widen the viewing angle of the liquid crystal display panel 400.

Further, the first to fourth slits 134a, 134b, 134c, and 134d are formed corresponding to the first to fourth domains DM1 to DM4, respectively. Especially, the first slits 134a are aligned substantially parallel to the fifth direction D5 in the first domain DM1, and the second slits 134b are aligned substantially parallel to the sixth direction D6 in the second domain DM2. The third slits 134c are aligned substantially parallel to the seventh direction D7 in the third domain DM3, and the slits 134d are aligned substantially parallel to the eighth direction D8 in the fourth domain DM4.

The first to fourth domains DM1 to DM4 may have different liquid crystal alignment directions than those shown in FIGS. 4C and 5C.

Figure 6:
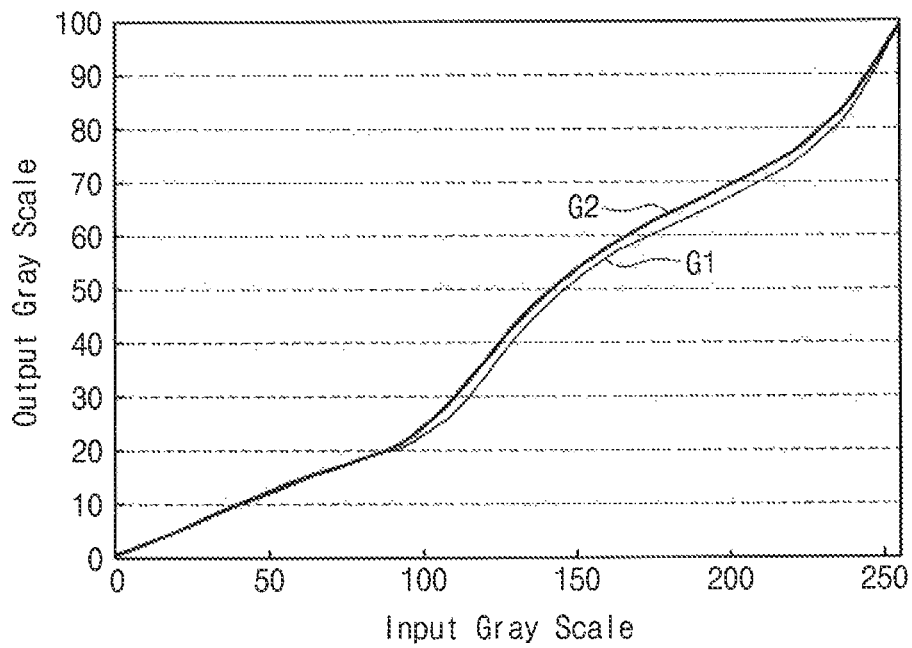
FIG. 6 is a graph showing side gamma curves of two liquid crystal display panels.

FIG. 6 is a graph showing side gamma curves of two liquid crystal display panels. In FIG. 6, a first graph G1 represents the side gamma curve according to a comparison example in which no slits 134a, 134b, 134c, and 134d are formed in the first sub-pixel electrode 133a, and a second graph G2 represents the side gamma curve according to an exemplary embodiment of the present invention in which the slits 134a, 134b, 134c, and 134d are formed in the first sub-pixel electrode 133a.

Referring to FIG. 6, the gamma curve is shifted to the left when the slits 134a, 134b, 134c, and 134d are formed in the first sub-pixel electrode 133a versus when the slits 134a, 134b, 134c, and 134d are not formed in the first sub-pixel electrode 133a.

Consequently, when the slits 134a, 134b, 134c, and 134d are formed in the first sub-pixel electrode 133a, output gray scales with respect to input gray scales are higher, after a specific input gray scale value (e.g., around input gray scale 100), in comparison with when the slits 134a, 134b, 134c, and 134d are not formed in the first sub-pixel electrode 133a.

Figure 7:
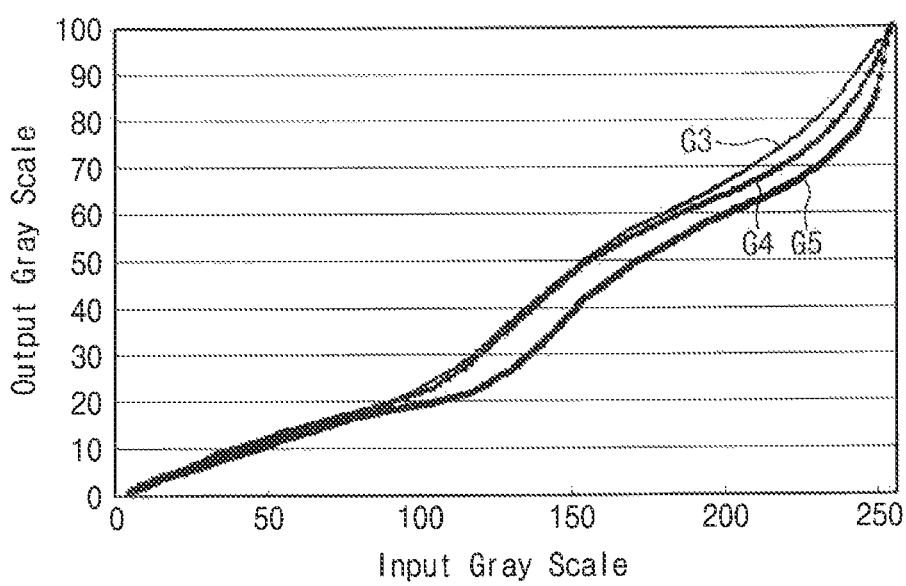
FIG. 7 is a graph showing side gammas curve of first, second, and third pixels displaying red, green, and blue colors, respectively.

FIG. 7 is a graph showing side gamma curves of first, second, and third pixels displaying red, green, and blue colors, respectively. In FIG. 7, a third graph G3 represents the side gamma curve of the first pixel PX1, a fourth graph G4 represents the side gamma curve of the second pixel PX2, and a fifth graph G5 represents the side gamma curve of the third pixel PX3.

Referring to FIG. 7, after the specific input gray scale value (e.g., input gray scale 100), the output gray scale of the third pixel PX3 is low compared with the output gray scale of the first and second pixels PX1 and PX2 with respect to the same input gray scale values. Consequently, when the blue gamma value (of the third pixel PX3) is different from the red and green gamma values (of the first and second pixels PX1 and PX2, respectively) in a specific input gray scale range (e.g., around input gray scale 128), a white color coordinate (Wx, Wy) moves to a yellow wavelength range, thereby causing deterioration in visibility.

However, when the slits 134a, 134b, 134c, and 134d are formed in the first sub-pixel electrode 133a of the third pixel PX3 as shown in FIG. 1, the blue gamma curve moves to the left. Consequently, when the slits 134a, 134b, 134c, and 134d are formed in the first sub-pixel electrode 133a of the third pixel PX3, the white color coordinate (Wx, Wy) may be prevented from moving to the yellow wavelength range.

Figure 8:
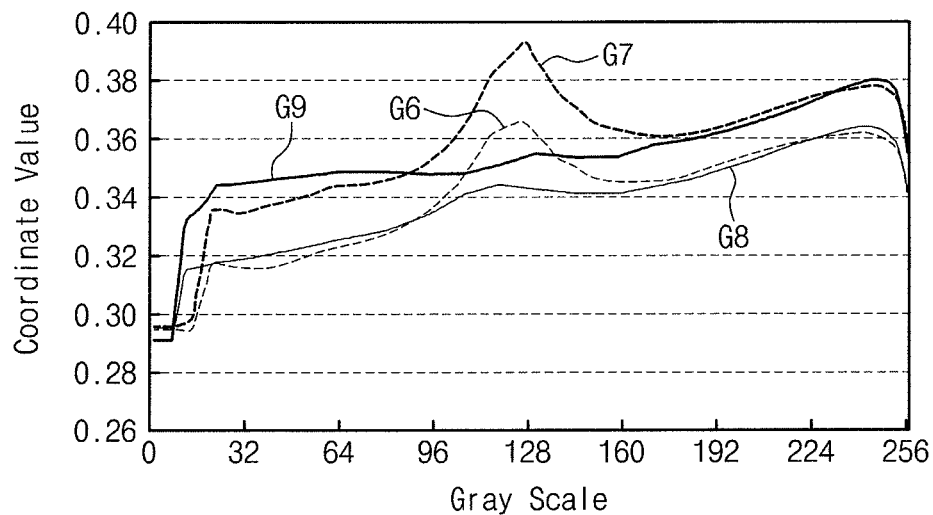
FIG. 8 is a graph showing x-coordinate values and y-coordinate values of two white color coordinate values.

FIG. 8 is a graph showing x-coordinate values and y-coordinate values of two white color coordinate values. In FIG. 8, sixth and seventh graphs G6 and G7 represent an x-coordinate value Wx and a y-coordinate value Wy, respectively, according to a comparison example in which the slits 134a, 134b, 134c, and 134d are not formed in the first sub-pixel electrode 133a, and eighth and ninth graphs G8 and G9 represent an x-coordinate value Wx and a y-coordinate value Wy, respectively, according to an exemplary embodiment of the present invention in which the slits 134a, 134b, 134c, and 134d are formed in the first sub-pixel electrode 133a.

Referring to FIG. 8, in the case that the slits 134a, 134b, 134c, and 134d are not formed in the first sub-pixel electrode 133a, the white color coordinate value (Wx, Wy) is increased in the specific input gray scale range (e.g., around input gray scale 128).

However, when the slits 134a, 134b, 134c, and 134d are formed in the first sub-pixel electrode 133a, the white color coordinate value (Wx, Wy) is uniform over the whole gray scale range. In other words, when the slits 134a, 134b, 134c, and 134d are formed in the first sub-pixel electrode 133a, the white color coordinate value (Wx, Wy) may be prevented from moving to the yellow wavelength range in the specific input gray scale range (e.g., around input gray scale 128).

Figure 9:
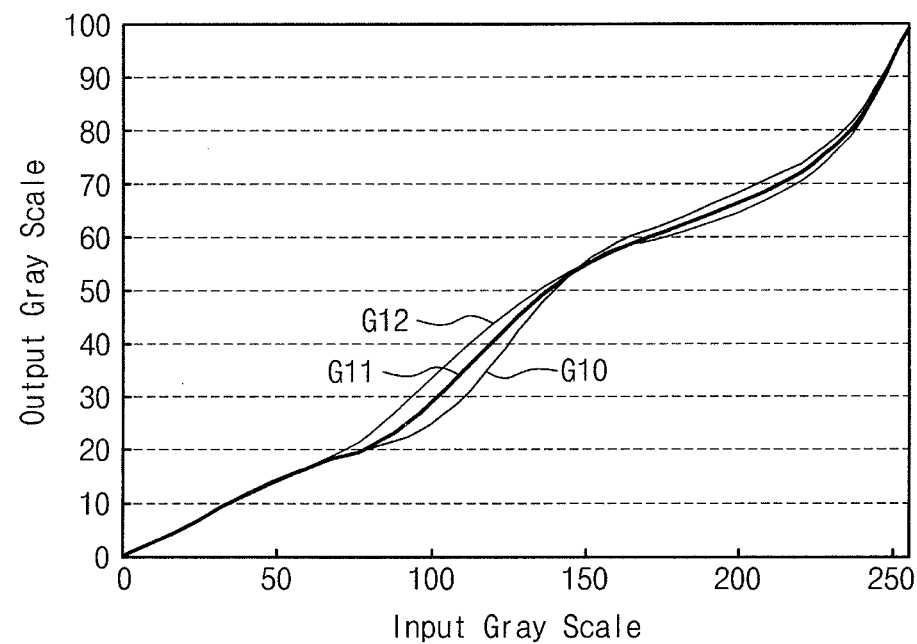
FIG. 9 is a graph showing a variation of side gamma curves according to a voltage ratio of a second sub-pixel electrode to a first sub-pixel electrode, according to an exemplary embodiment of the present invention.

FIG. 9 is a graph showing a variation of side gamma curves according to a voltage ratio of the second sub-pixel electrode to the first sub-pixel electrode, according to an exemplary embodiment of the present invention. In FIG. 9, a tenth graph G10 represents that the voltage ratio of the second pixel voltage charged in the second sub-pixel to the first pixel voltage charged in the first sub-pixel is about 0.75, an eleventh graph G11 represents that the voltage ratio of the second pixel voltage to the first pixel voltage is about 0.8, and a twelfth graph G12 represents that the voltage ratio of the second pixel voltage to the first pixel voltage is about 0.85.

Referring to FIG. 9, as the voltage ratio of the second pixel voltage to the first pixel voltage becomes large, the side gamma curve moves to the left. Consequently, the side gamma curve of the blue pixel, e.g., the third pixel PX3, moves to the left as the voltage difference between the first pixel voltage and the second pixel voltage becomes large.

As shown in FIG. 7, to compensate for the blue gamma value that is different from the red and green gamma values with respect to the same input gray scale, the voltage ratio of the second pixel voltage to the first pixel voltage in the third pixel PX3 may be set to be different from the voltage ratio of the second pixel voltage to the first pixel voltage in each of the first and second pixels PX1 and PX2.

In detail, the voltage ratio of the second pixel voltage to the first pixel voltage in the third pixel PX3 is larger than the voltage ratio of the second pixel voltage to the first pixel voltage in each of the first and second pixels PX1 and PX2. In addition, the voltage ratio of the second pixel voltage to the first pixel voltage in the first pixel PX1 is equal to or smaller than the voltage ratio of the second pixel voltage to the first pixel voltage in the second pixel PX2.

As an example, the voltage ratio of the second pixel voltage to the first pixel voltage in the first pixel PX1 is set to about 0.59 to about 0.845, and the voltage ratio of the second pixel voltage to the first pixel voltage in the second pixel PX2 is set to about 0.6 to about 0.85. In this case, the voltage ratio of the second pixel voltage to the first pixel voltage in the third pixel PX3 is set to about 0.61 to about 0.9.

As described above, when the voltage ratio of the second pixel voltage to the first pixel voltage in the third pixel PX3 is set to be larger than the voltage ratio of the second pixel voltage to the first pixel voltage in each of the first and second pixels PX1 and PX2, the difference between the blue gamma value and the red gamma value and between the blue gamma value and the green gamma value may be reduced.

Figure 10:
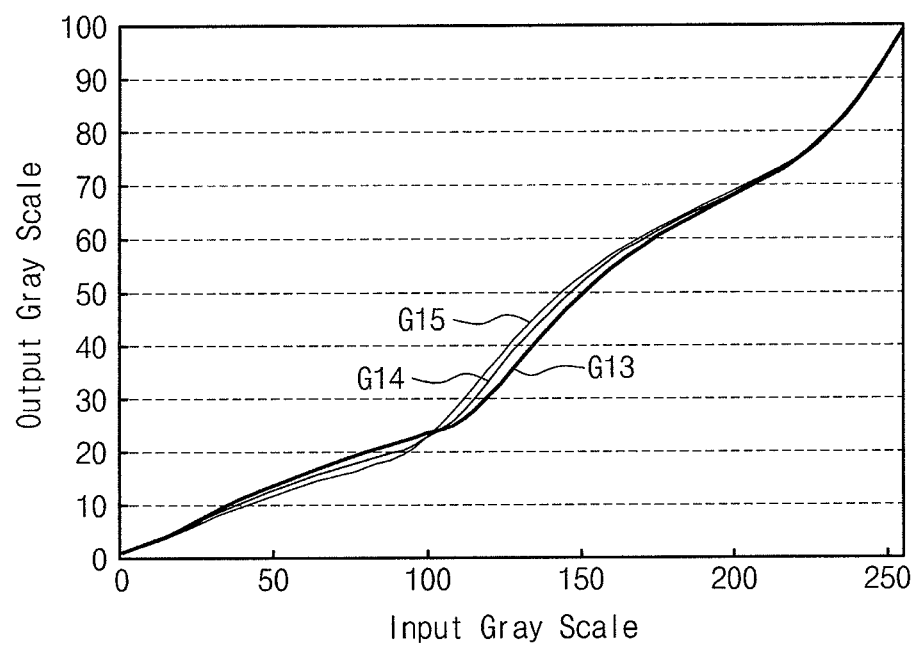
FIG. 10 is a graph showing a variation of gamma curves according to an area ratio of a second sub-pixel electrode to a first sub-pixel electrode, according to an exemplary embodiment of the present invention.

FIG. 10 is a graph showing a variation of gamma curves according to an area ratio of the second sub-pixel electrode to the first sub-pixel electrode, according to an exemplary embodiment of the present invention. In FIG. 10, a thirteenth graph G13 represents that the area ratio of the second sub-pixel electrode to the first sub-pixel electrode is 1:1.6, a fourteenth graph G14 represents that the area ratio of the second sub-pixel electrode to the first sub-pixel electrode is 1:2, and a fifteenth graph G15 represents that the area ratio of the second sub-pixel electrode to the first sub-pixel electrode is 1:2.4.

Referring to FIG. 10, as the area ratio of the second sub-pixel electrode 133b to the first sub-pixel electrode 133a becomes large, the gamma curve moves to the left. Consequently, the blue gamma curve moves to the left as the second sub-pixel electrode 133b becomes larger than the first sub-pixel electrode 133a.

As shown in FIG. 7, to compensate for the blue gamma value that is different from the red and green gamma values with respect to the same input gray scale, the area ratio of the second sub-pixel electrode 133b to the first sub-pixel electrode 133a in the third pixel PX3 may be set to be different from the area ratio of the second sub-pixel electrodes 131b and 132b to the first sub-pixel electrodes 131a and 132a in the first and second pixels PX1 and PX2.

In detail, the area ratio of the second sub-pixel electrode 133b to the first sub-pixel electrode 133a in the third pixel PX3 is larger than the area ratio of the second sub-pixel electrode 132b to the first sub-pixel electrode 132a in the second pixel PX2. As an example, the area ratio of the second sub-pixel electrode 133b to the first sub-pixel electrode 133a in the third pixel PX3 is about 1:1.1 to about 1:3.5, and the area ratio of the second sub-pixel electrode 132b to the first sub-pixel electrode 132a in the second pixel PX2 is about 1:1 to about 1:2.5. In this case, the area ratio of the second sub-pixel electrode 132b to the first sub-pixel electrode 132a in the second pixel PX2 is equal to the area ratio of the second sub-pixel electrode 131b to the first sub-pixel electrode 131a in the first pixel PX1.

As described above, when the area ratio of the second sub-pixel electrode 133b to the first sub-pixel electrode 133a in the third pixel PX3 is set to be larger than the area ratio of the second sub-pixel electrodes 131b and 132b to the first sub-pixel electrodes 131a and 132a in the first and second pixels PX1 and PX2, the difference between the blue gamma value and the red gamma value and between the blue gamma value and the green gamma value may be reduced.

Figure 11:
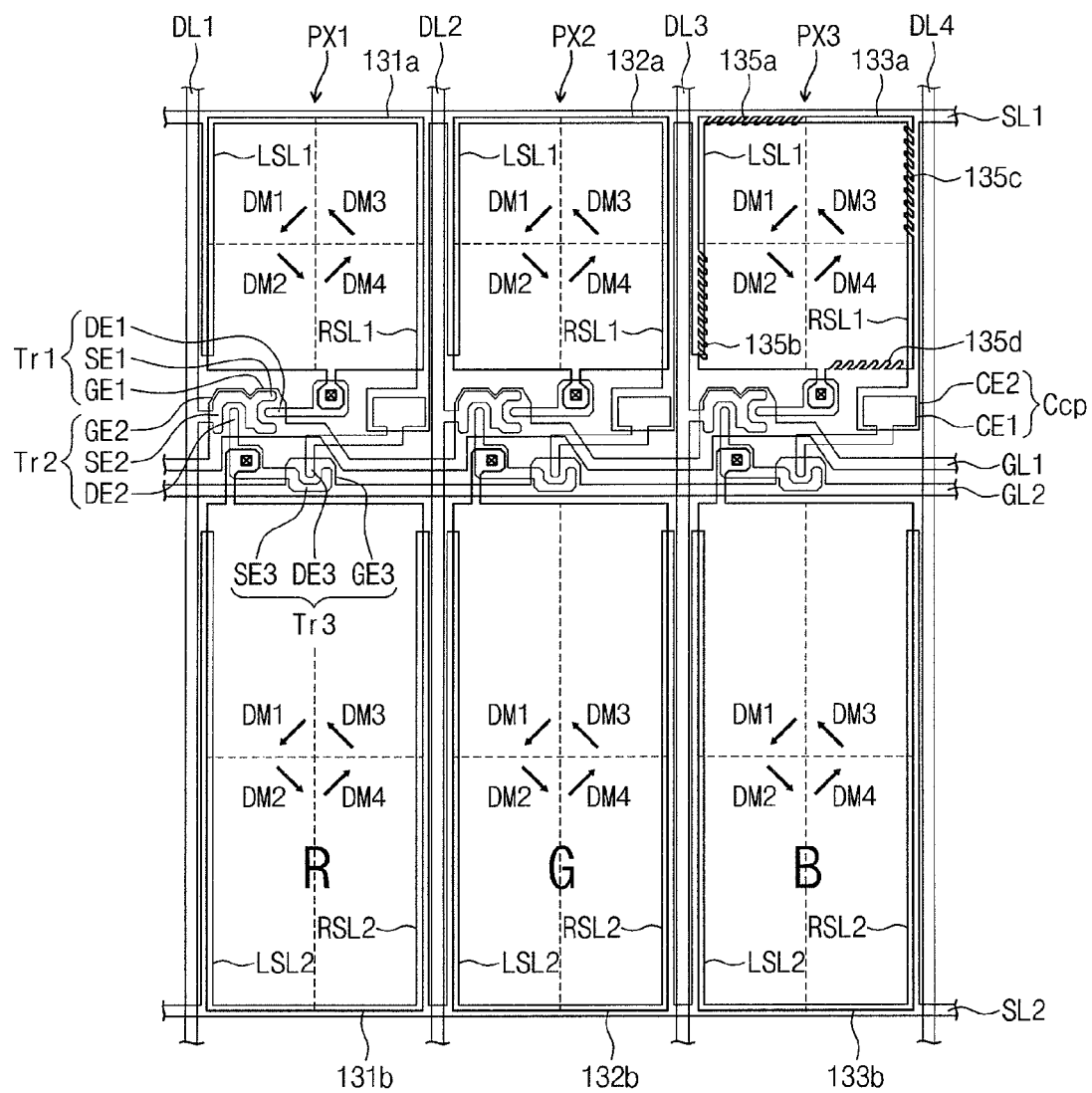
FIG. 11 is a plan view showing a pixel part of a liquid crystal display panel according to an exemplary embodiment of the present invention.

FIG. 11 is a plan view showing a pixel part of a liquid crystal display panel 405 according to an exemplary embodiment of the present invention. In FIG. 11, the same reference numerals denote the same elements in FIG. 1, and thus detailed descriptions of the same elements will be omitted.

Referring to FIG. 11, each of the first sub-pixel electrodes 131a, 132a, and 133a is divided into the first to fourth domains DM1 to DM4 having the different liquid crystal alignment directions from each other. As an example, the liquid crystal alignment directions of the first to fourth domains DM1 to DM4 are in the counter-clockwise direction. In addition, each of the second sub-pixel electrodes 131b, 132b, and 133b is divided into the first to fourth domains DM1 to DM4 having the different liquid crystal alignment directions from each other. As an example, the liquid crystal alignment directions of the first to fourth domains DM1 to DM4 are in the counter-clockwise direction.

The first and second sub-pixel electrodes of one or more of the first, second, and third pixels PX1, PX2, and PX3 for the pixel part are provided with a plurality of slits. In the present exemplary embodiment, the first sub-pixel electrode 133a included in the third pixel PX3 that displays the blue color among the first, second, and third pixels PX1, PX2, and PX3 may be provided with the slits.

The slits include fifth, sixth, seventh, and eighth slits 135a, 135b, 135c, and 135d respectively corresponding to the first, second, third, and fourth domains DM1 to DM4, and each of the fifth to eighth slits 135a, 135b, 135c, and 135d is formed substantially parallel to the liquid crystal alignment direction of the corresponding domain among the first to fourth domains DM1 to DM4. As an example, the fifth to eighth slits 135a, 135b, 135c, and 135d are formed in the first sub-pixel electrode 133a except for an area in which the fringe field is formed.

In detail, the fifth slit 135a is formed by cutting the first sub-pixel electrode 133a from a first side of the first sub-pixel electrode 133a among four sides of the first sub-pixel electrode 133a, which is substantially parallel to and disposed on the first storage line SL1, inward to the first domain DM1 such that the fifth slit 135a is formed substantially parallel to the liquid crystal alignment direction of the first domain DM1. The sixth slit 135b is formed by cutting the first sub-pixel electrode 133a from a second side of the first sub-pixel electrode 133a among four sides of the first sub-pixel electrode 133a, which is substantially parallel to and disposed on the first branch electrode LSL1, inward to the second domain DM2 such that the sixth slit 135b is formed substantially parallel to the liquid crystal alignment direction of the second domain DM2.

The seventh slit 135c is formed by cutting the first sub-pixel electrode 133a from a third side of the first sub-pixel electrode 133a among four sides of the first sub-pixel electrode 133a, which is substantially parallel to the first storage line SL1 and disposed adjacent to the first gate line GL1, inward to the third domain DM3 such that the seventh slit 135c is formed substantially parallel to the liquid crystal alignment direction of the third domain DM3. The eighth slit 135d is formed by cutting the first sub-pixel electrode 133a from a fourth side of the first sub-pixel electrode 133a among four sides of the first sub-pixel electrode 133a, which is substantially parallel to and disposed on the second branch electrode RSL1, inward to the fourth domain DM4 such that the eighth slit 135d is formed substantially parallel to the liquid crystal alignment direction of the fourth domain DM4.

In the present exemplary embodiment, each of the fifth to eighth slits 135a to 135d may have a length corresponding to approximately 10 percent of a width of the first sub-pixel electrode 133a. In addition, the entire area in which the first to fourth slits 134a to 134d are formed corresponds to about 10 percent to about 90 percent of the entire area of the first sub-pixel electrode 133a.

Figure 12A:
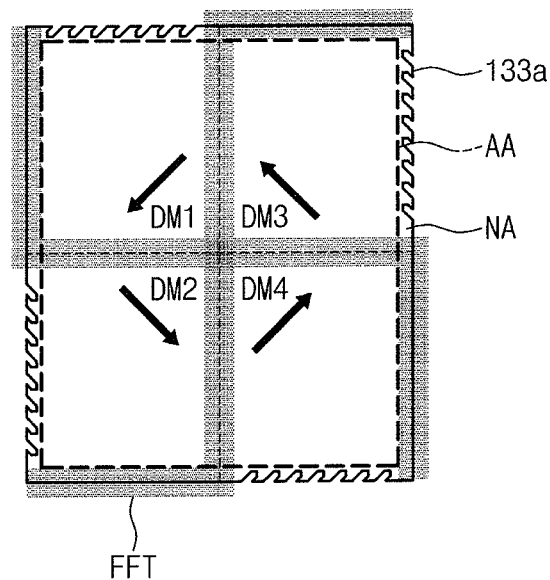
FIG. 12A is a plan view showing a first sub-pixel electrode of a third pixel according to an exemplary embodiment of the present invention.
Figure 12B:
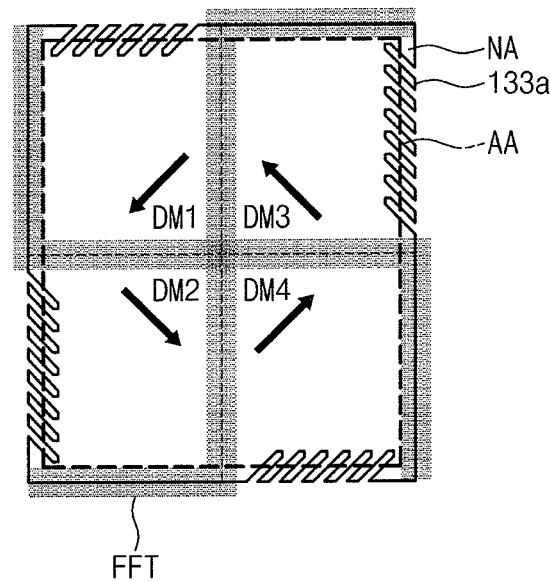
FIG. 12B is a plan view showing a first sub-pixel electrode of a third pixel according to an exemplary embodiment of the present invention.

FIG. 12A is a plan view showing a first sub-pixel electrode of a third pixel according to an exemplary embodiment of the present invention, and FIG. 12B is a plan view showing a first sub-pixel electrode of a third pixel according to an exemplary embodiment of the present invention.

Referring to FIG. 12A, the first sub-pixel electrode 133a includes the first to fourth domains DM1 to DM4 having different liquid crystal alignment directions from each other.

The alignment directions of the liquid crystal layer 300 in the first to fourth domains DM1 to DM4 are in the counter-clockwise direction. In this case, a fringe field area FFT corresponding to boundaries between the first to fourth domains DM1 to DM4 is formed in the first sub-pixel electrode 133a.

In addition, the first sub-pixel electrode 133a includes an effective display area AA in which the image is substantially displayed and a non-display area NA surrounding the effective display area AA.

Further, the fifth to eighth slits 135a, 135b, 135c, and 135d are formed to respectively correspond to the first to fourth domains DM1 to DM4 and positioned in the area in which the fringe field area FFT is not positioned. In addition, the fifth to eighth slits 135a, 135b, 135c, and 135d may be formed in the non-display area NA. Accordingly, the transmittance of the third pixel PX3 may be prevented from being lowered due to the fifth to eighth slits 135a, 135b, 135c, and 135d.

As shown in FIG. 12B, the fifth to eighth slits 135a, 135b, 135c, and 135d may be extended to the effective area AA.

Figure 13:
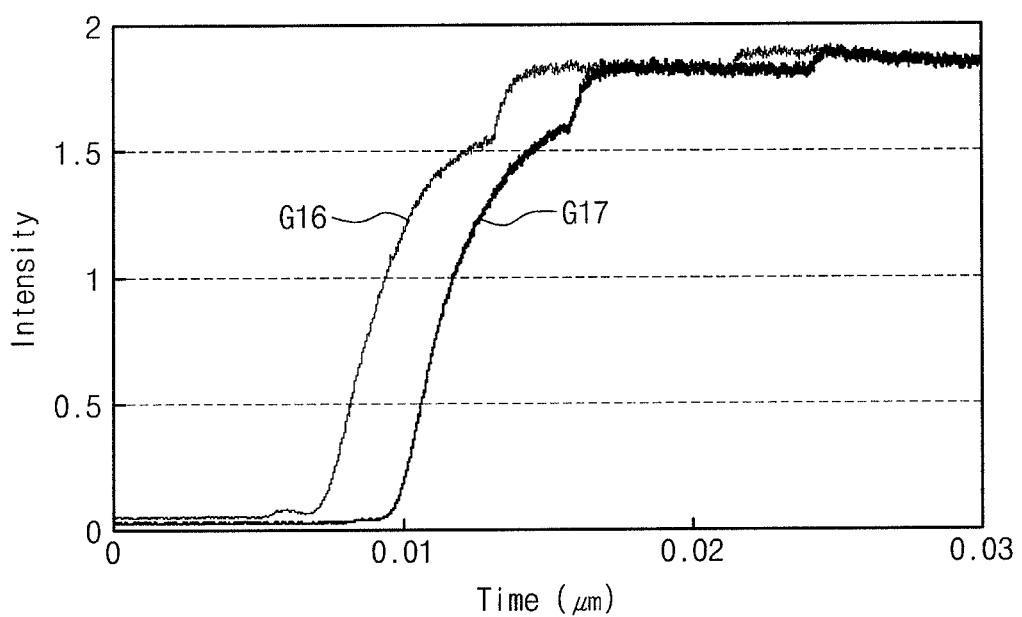
FIG. 13 is a graph showing a liquid crystal response characteristic of a first pixel and a third pixel, according to an exemplary embodiment of the present invention.

FIG. 13 is a graph showing a liquid crystal response characteristic of a first pixel and a third pixel, according to an exemplary embodiment of the present invention. In FIG. 13, a sixteenth graph G16 represents the liquid crystal response characteristic of the first pixel PX1 and a seventeenth graph G17 represents the liquid crystal response characteristic of the third pixel PX3.

Referring to FIG. 13, the initial response speed of the third pixel PX3 in which the slits 135a, 135b, 135c, and 135d are formed is faster than the initial response speed of the first pixel PX1 in which the slits 135a, 135b, 135c, and 135d are not formed.

In FIGS. 11, 12A, and 12B, the structure in which the slits 135a, 135b, 135c, and 135d are formed in the first sub-pixel electrode 133a of the third pixel PX3 has been shown, but the slits 135a, 135b, 135c, and 135d may be formed in the first sub-pixel electrode 133a of each of the first and second pixels PX1 and PX2 to improve the response speed of each of these pixels.

Figure 14:
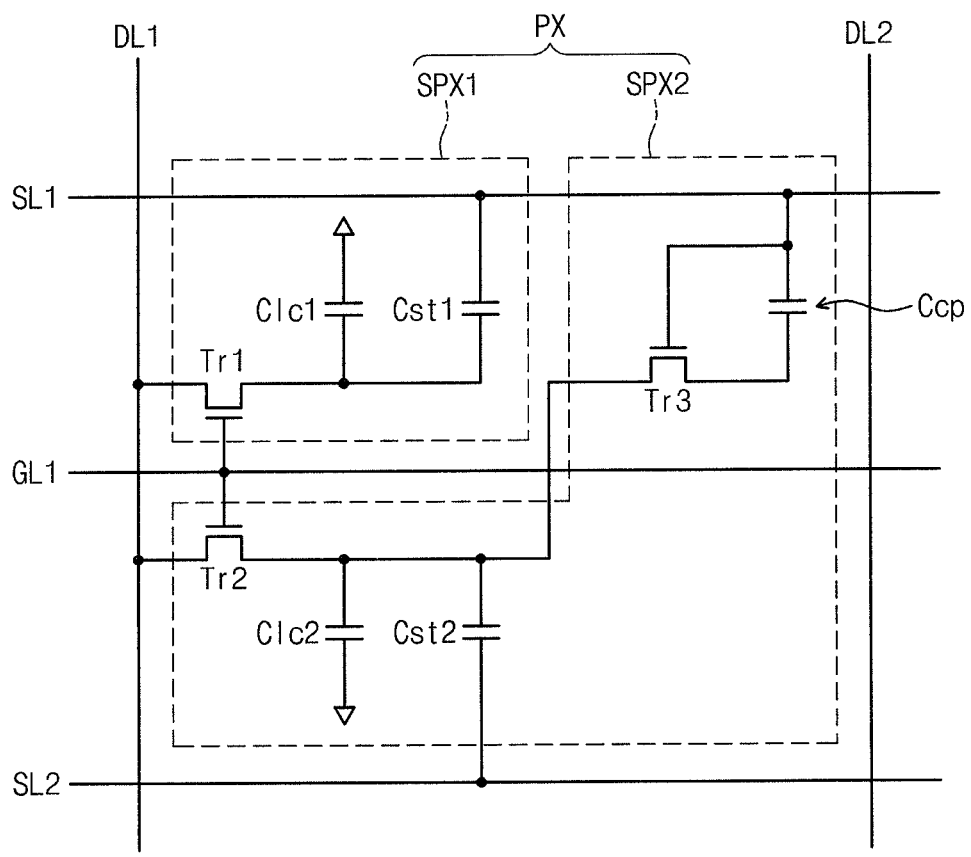
FIG. 14 is an equivalent circuit diagram showing a pixel in a liquid crystal display panel according to an exemplary embodiment of the present invention.
Figure 15:
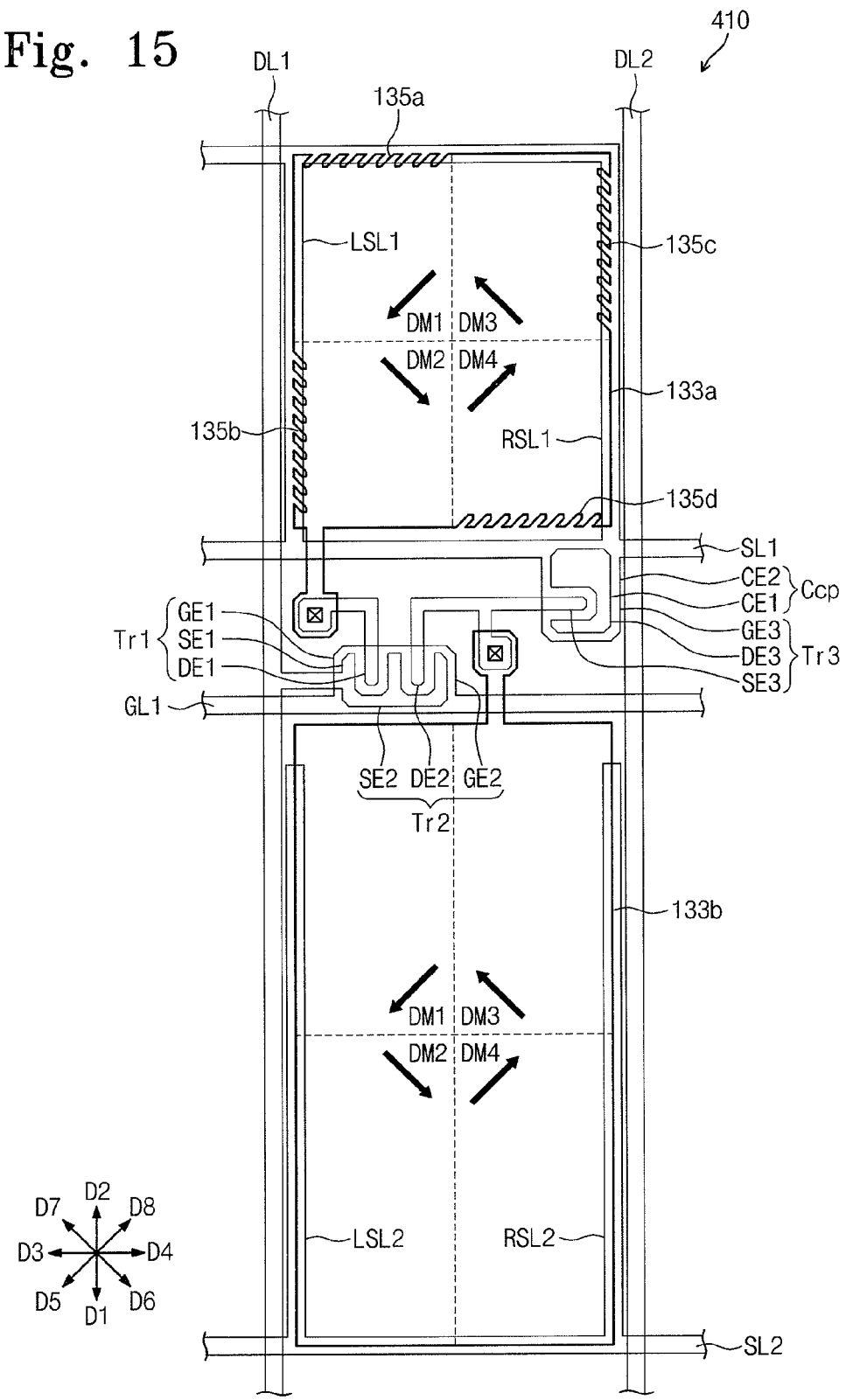
FIG. 15 is a plan view showing an array substrate including the pixel shown in FIG. 14, according to an exemplary embodiment of the present invention.

FIG. 14 is an equivalent circuit diagram showing a pixel in a liquid crystal display panel according to an exemplary embodiment of the present invention, and FIG. 15 is a plan view showing an array substrate 410 including the pixel shown in FIG. 14, according to an exemplary embodiment of the present invention.

Referring to FIGS. 14 and 15, a pixel PX according to an exemplary embodiment of the present invention includes a first sub-pixel SPX1 and a second sub-pixel SPX2. The first sub-pixel SPX1 includes a first thin film transistor Tr1, a first liquid crystal capacitor Clc1, and a first storage capacitor Cst1, and the second sub-pixel SPX2 includes a second thin film transistor Tr2, a second liquid crystal capacitor Clc2, a second storage capacitor Cst2, a third thin film transistor Tr3, and a coupling capacitor Ccp.

The first thin film transistor Tr1 includes a gate electrode GE1 branched from the first gate line GL1, a source electrode SE1 branched from the first data line DL1, and a first drain electrode DE1 electrically connected to a first sub-pixel electrode 133a. The first sub-pixel electrode 133a partially overlaps the first storage line SL1, the first branch electrode LSL1, and the second branch electrode RSL1 to form the first storage capacitor Cst1 as shown in FIG. 14.

The first sub-pixel electrode 133a is divided into the first to fourth domains DM1 to DM4 having the different liquid crystal alignment directions from each other. Especially, the liquid crystal alignment directions of the first to fourth domains DM1 to DM4 are in the counter-clockwise direction. Fifth to eighth slits 135a, 135b, 135c, and 135d are formed in the first to fourth domains DM1 to DM4, respectively. Each of the fifth to eighth slits 135a, 135b, 135c, and 135d is formed substantially parallel to the liquid crystal alignment direction of the corresponding domain among the first to fourth domains DM1 to DM4.

The first sub-pixel electrode 133a may include the first to fourth slits 134a, 134b, 134c, and 134d shown in FIG. 1.

Further, the second thin film transistor Tr2 includes a second gate electrode GE2 branched from the first gate line GL1, a second source electrode SE2 branched from the first data line DL1, and a second drain electrode DE2 electrically connected to a second sub-pixel electrode 133b. The second sub-pixel electrode 133b is divided into first to fourth domains DM1 to DM4 having the different liquid crystal alignment directions from each other. Especially, the liquid crystal alignment directions of the first to fourth domains DM1 to DM4 are in the counter-clockwise direction.

The third thin film transistor Tr3 includes a third gate electrode GE3 branched from the first storage line SL1, a third source electrode SE3 extended from the second drain electrode DE2, and a third drain electrode DE3 connected to the coupling capacitor Ccp. The coupling capacitor Ccp includes a first electrode CE1 extended from the third drain electrode DE3 and a second electrode CE2 extended from the first storage line SL1 to face the first electrode CE1, but is not limited thereto.

When a first gate signal is applied to the first gate line GL1, the first and second thin film transistors Tr1 and Tr2 are substantially simultaneously turned on. The data voltage applied to the first data line DL1 is applied to the first and second liquid crystal capacitor Clc1 and Clc2 through the turned-on first and second thin film transistors Tr1 and Tr2. Thus, the first and second liquid crystal capacitors Clc1 and Clc2 may be charged with the same pixel voltage.

The third thin film transistor Tr3 is turned on in response to the storage voltage applied to the first storage line SL1. When the third thin film transistor Tr3 is turned on by the storage voltage, a voltage division occurs between the first liquid crystal capacitor Clc1 and the coupling capacitor Ccp according to the charge rate of the first liquid crystal capacitor Clc1 and the charge rate of the coupling capacitor Ccp. Consequently, while the first liquid crystal capacitor Clc1 is charged with a first pixel voltage, the second liquid crystal capacitor Clc2 is charged with a second pixel voltage smaller than the first pixel voltage by the third thin film transistor Tr3 and the coupling capacitor Ccp.

Figure 16:
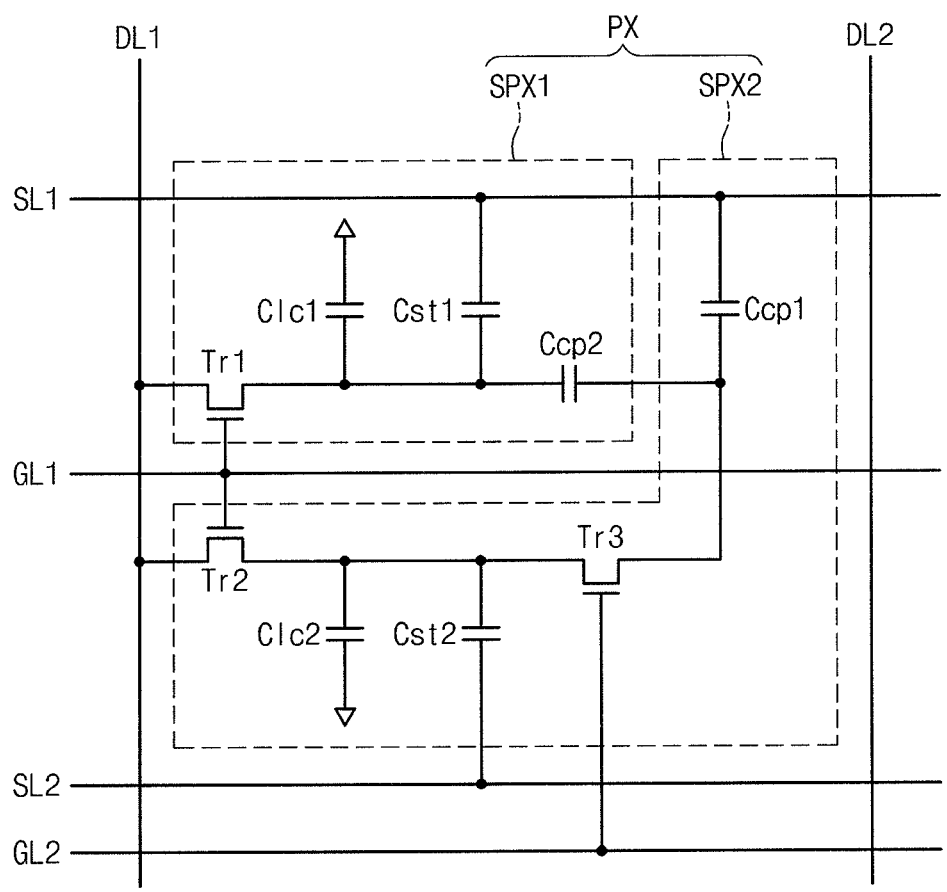
FIG. 16 is an equivalent circuit diagram showing a pixel in a liquid crystal display panel according to an exemplary embodiment of the present invention.
Figure 17:
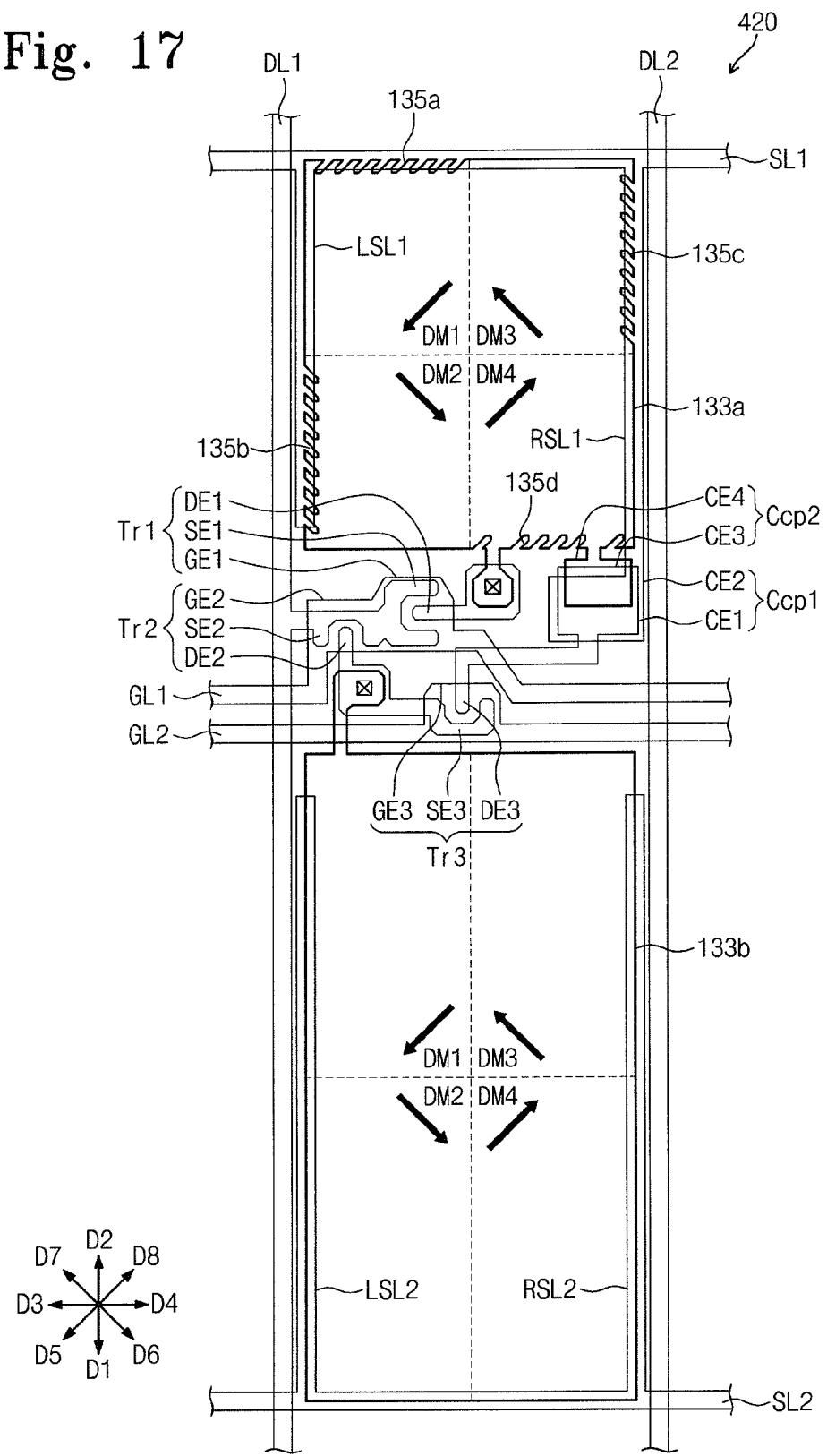
FIG. 17 is a plan view showing an array substrate including the pixel shown in FIG. 16, according to an exemplary embodiment of the present invention.

FIG. 16 is an equivalent circuit diagram showing a pixel in a liquid crystal display panel according to an exemplary embodiment of the present invention, and FIG. 17 is a plan view showing an array substrate 420 including the pixel shown in FIG. 16, according to an exemplary embodiment of the present invention. In FIGS. 16 and 17, a pixel has a structure similar to that of FIG. 11 except for a second coupling capacitor Ccp2.

Referring to FIGS. 16 and 17, a first coupling capacitor Ccp1 is provided between the third drain electrode DE3 of the third thin film transistor Tr3 and the first storage line SL1. Particularly, the first coupling capacitor Ccp1 includes a first electrode CE1 extended from the third drain electrode DE3 and a second electrode CE2 extended from the first storage line SL1 to face the first electrode CE1.

Further, the second coupling capacitor Ccp2 is provided between the third drain electrode DE3 of the third thin film transistor Tr3 and the first sub-pixel electrode 133a. In detail, the second coupling capacitor Ccp2 includes a third electrode CE3 extended from the first electrode CE1 and a fourth electrode CE4 extended from the first sub-pixel electrode 133a to face the third electrode CE3.

The first sub-pixel electrode 133a is divided into first to fourth domains DM1 to DM4 having different liquid crystal alignment directions from each other. The liquid crystal alignment directions of the first to fourth domains DM1 to DM4 are in the counter-clockwise direction. The fifth to eighth slits 135a, 135b, 135c, and 135d are formed in the first to fourth domains DM1 to DM4, respectively. Each of the fifth to eighth slits 135a, 135b, 135c, and 135d is formed substantially parallel to the liquid crystal alignment direction of the corresponding domain among the first to fourth domains DM1 to DM4.

The first sub-pixel electrode 133a may include the first to fourth slits 134a, 134b, 134c, and 134d shown in FIG. 1.

Further, the second gate electrode GE2 of the second thin film transistor Tr2 is branched from the first gate line GL1 and the second source electrode SE2 is branched from the first data line DL1. The second drain electrode DE2 of the second thin film transistor Tr2 is electrically connected to the second sub-pixel electrode 133b. The second sub-pixel electrode 133b is divided into first to fourth domains DM1 to DM4 having different liquid crystal alignment directions from each other. The liquid crystal alignment directions of the first to fourth domains DM1 to DM4 are in the counter-clockwise direction.

When the third thin film transistor Tr3 is turned on in response to a second gate signal applied to the second gate line GL2, a voltage division occurs between the first coupling capacitor Ccp1 and the second coupling capacitor Ccp2. Due to the voltage division, the first coupling capacitor Ccp1 and the second liquid crystal capacitor Clc2 are charged with the same voltage, but the second pixel voltage charged in the second liquid crystal capacitor Clc2 becomes lower than the first pixel voltage charged in the first liquid crystal capacitor Clc1.

In addition, when the first liquid crystal capacitor Clc1 is connected to the first coupling capacitor Ccp1 through the second coupling capacitor Ccp2, the first pixel voltage charged in the first liquid crystal capacitor Clc1 may be increased by the coupling of the first coupling capacitor Ccp1.

Figure 18:
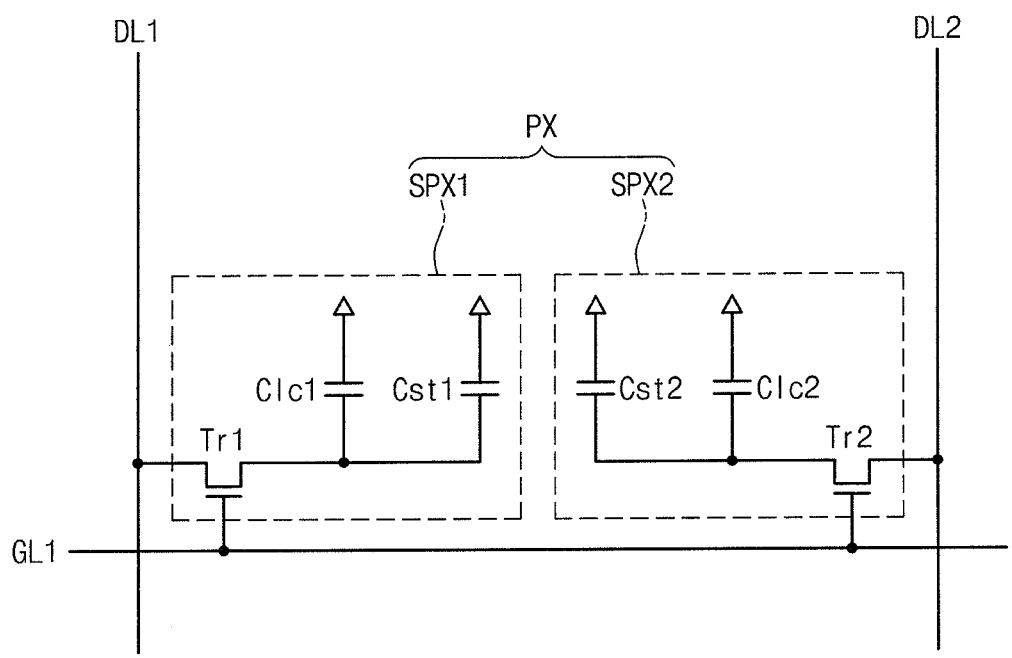
FIG. 18 is an equivalent circuit diagram showing a pixel in a liquid crystal display panel according to an exemplary embodiment of the present invention.
Figure 19:
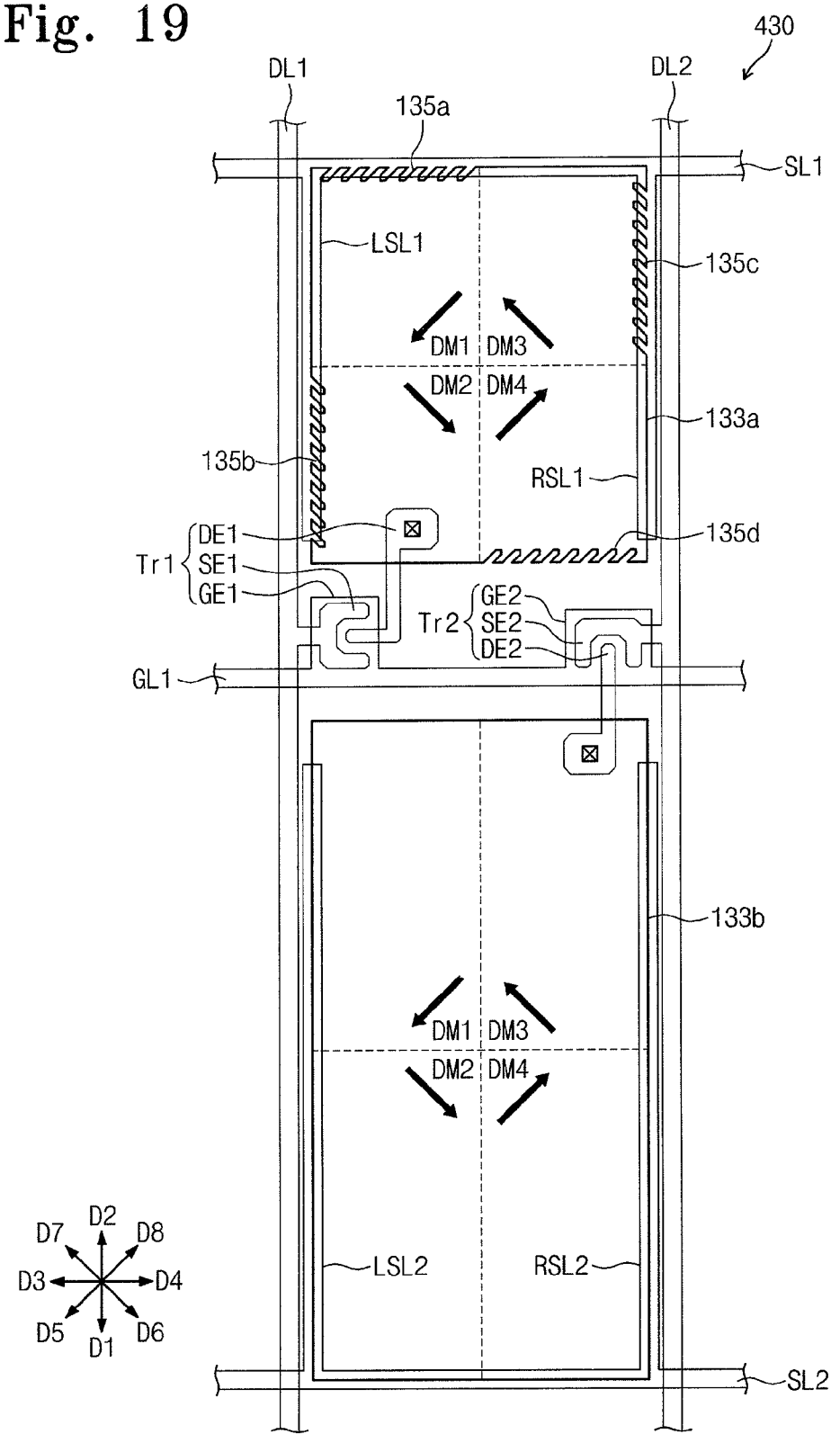
FIG. 19 is a plan view showing an array substrate including the pixel shown in FIG. 18, according to an exemplary embodiment of the present invention.

FIG. 18 is an equivalent circuit diagram showing a pixel in a liquid crystal display panel according to an exemplary embodiment of the present invention, and FIG. 19 is a plan view showing an array substrate 430 including the pixel shown in FIG. 18, according to an exemplary embodiment of the present invention.

Referring to FIGS. 18 and 19, a pixel PX includes a first sub-pixel SPX1 and a second sub-pixel SPX2. The first sub-pixel SPX1 includes a thin film transistor Tr1, a first liquid crystal capacitor Clc1, and a first storage capacitor Cst1, and the second sub-pixel SPX2 includes a second thin film transistor Tr2, a second liquid crystal capacitor Clc2, and a second storage capacitor Cst2.

The first thin film transistor Tr1 includes a first gate electrode GE1 branched from the first gate line GL1, a first source electrode SE1 branched from the first data line DL1, and a first drain electrode DE1 electrically connected to the first sub-pixel electrode 133*a*. The first sub-pixel electrode 133*a* partially overlaps the first storage line SL1, the first branch electrode LSL1, and the second branch electrode RSL1 to form the first storage capacitor Cst1.

The first sub-pixel electrode 133*a* is divided into first to fourth domains DM1 to DM4 having different liquid crystal alignment directions from each other. The liquid crystal alignment directions of the first to fourth domains DM1 to DM4 are in the counter-clockwise direction. The fifth to eighth slits 135*a*, 135*b*, 135*c*, and 135*d* are formed in the first to fourth domains DM1 to DM4, respectively. Each of the fifth to eighth slits 135*a*, 135*b*, 135*c*, and 135*d* is formed substantially parallel to the liquid crystal alignment direction of the corresponding domain among the first to fourth domains DM1 to DM4.

The first sub-pixel electrode 133*a* may include the first to fourth slits 134*a*, 134*b*, 134*c*, and 134*d* shown in FIG. 1.

The second thin film transistor Tr2 includes a second gate electrode GE2 branched from the first gate line GL1, a second source electrode SE2 branched from the second data line DL2, and a second drain electrode DE2 electrically connected to the second sub-pixel electrode 133*b*.

The second sub-pixel electrode 133*b* partially overlaps the second storage line SL2, the third branch electrode LSL2, and the fourth branch electrode RSL2 to form the second storage capacitor Cst2. The second sub-pixel electrode 133*b* is divided into first to fourth domains DM1 to DM4 having different liquid crystal alignment directions from each other. The liquid crystal alignment directions of the first to fourth domains DM1 to DM4 are in the counter-clockwise direction.

When the gate signal is applied to the first gate line GL1, the first and second thin film transistors Tr1 and Tr2 are substantially simultaneously turned on. The first data voltage applied to the first data line DL1 is applied to the first liquid crystal capacitor Clc1 through the turned-on first thin film transistor Tr1, and the second data voltage applied to the second data line DL2 is applied to the second liquid crystal capacitor Clc2 through the turned-on second thin film transistor Tr2. The first data voltage has a voltage level different from a voltage level of the second data voltage. Accordingly, the first liquid crystal capacitor Clc1 is charged with the pixel voltage different from the pixel voltage charged in the second liquid crystal capacitor Clc2. For instance, when the first liquid crystal capacitor Clc1 is charged with the first pixel voltage, the second liquid crystal capacitor Clc2 may be charged with the second pixel voltage lower than the first pixel voltage.

Exemplary embodiments of the present invention provide a liquid crystal display panel having at least one pixel with a plurality of slits in its first sub-pixel electrode. These slits widen the side visibility of the liquid crystal display panel due to their parallel arrangement with the liquid crystal alignment directions of the domains of the first sub-pixel electrode in which they are disposed. The side visibility is further enhanced by making the liquid crystal alignment directions in each of the domains of the first sub-pixel electrode and the liquid crystal alignment directions in each of the domains of the second sub-pixel electrode different from each other. When the first sub-pixel electrode having this slit and liquid crystal alignment direction configuration is included in a blue pixel, for example, a difference between a gamma value of the blue pixel and a gamma value of a red pixel and between the gamma value of the blue pixel and a gamma value of a green pixel may be reduced, thereby improving a side visibility of the liquid crystal display panel and a response speed of the blue color pixel.

Although the exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A liquid crystal display panel, comprising:
a plurality of pixels, wherein at least one of the pixels includes a first sub-pixel and a second sub-pixel, wherein the first sub-pixel is charged with a first voltage and the second sub-pixel is charged with a second voltage that is lower than the first voltage;
a first substrate comprising a first sub-pixel electrode of the first sub-pixel and a second sub-pixel electrode of the second sub-pixel;
a first alignment layer disposed on the first substrate, wherein the first alignment layer is aligned in a first direction and a second direction in each of the first and second sub-pixels;
a second substrate facing the first substrate;
a second alignment layer disposed on the second substrate, wherein the second alignment layer is aligned in a third direction and a fourth direction in each of the first and second sub-pixels to form a plurality of domains in each of the first and second sub-pixels; and
a liquid crystal layer disposed between the first alignment layer and the second alignment layer,
wherein the first sub-pixel electrode includes a plurality of slits and the slits are formed substantially parallel to a liquid crystal alignment direction in each of the domains of the first sub-pixel electrode,
wherein the pixels comprise first, second and third pixels, the at least one pixel is the third pixel and an area ratio of the second sub-pixel electrode to the first sub-pixel electrode in the third pixel is larger than an area ratio of a second sub-pixel electrode to a first sub-pixel electrode in the second pixel.

2. The liquid crystal display panel of claim 1, wherein the first pixel is configured to display a red color, the second pixel is configured to display a green color, and the third pixel is configured to display a blue color.

3. The liquid crystal display panel of claim 2, wherein each of the first and second sub-pixel electrodes of the third pixel comprises first, second, third, and fourth domains and the liquid crystal alignment directions of the first to fourth domains of the first sub-pixel electrode of the third pixel are different from each other, and a liquid crystal alignment direction in each of the first to fourth domains of the second nib-pixel electrode of the third pixel are different from each other.

4. The liquid crystal display panel of claim 3, wherein the slits comprise first, second, third, and fourth slits respectively corresponding to the first, second, third, and fourth domains of the first sub-pixel electrode of the third pixel, and each of the slits is formed substantially parallel to the liquid crystal alignment direction of its corresponding domain.

5. The liquid crystal display panel of claim 4, wherein the first sub-pixel electrode of the third pixel comprises a first fringe field area formed along edges of the first domain and having an L shape, a second fringe field area formed along edges of the second domain and having an L shape that is rotated 90 degrees in a counter-clockwise direction from the position of the L shape in the first domain, a third fringe field area formed along edges of the third domain and having an L shape rotated 90 degrees in a clockwise direction from the position of the L shape in the first domain, and a fourth fringe area formed along edges of the fourth domain and having an L shape rotated 180 degrees in the counter-clockwise direction from the position of the L shape in the first domain.

6. The liquid crystal display panel of claim 5, wherein the first, second, third, and fourth slits are provided in the first, second, third, and fourth fringe field areas, respectively.

7. The liquid crystal display panel of claim 4, wherein the first sub-pixel electrode of the third pixel comprises a first fringe field area formed along an edge of the first domain, a second fringe field area formed along an edge of the second domain, a third fringe field area formed along an edge of the third domain, and a fourth fringe field area formed along an edge of the fourth domain, and the first, second, third, and fourth slits are formed along the edges of the first sub-pixel electrode of the third pixel except where the first, second, third, and fourth fringe field areas are formed.

8. The liquid crystal display panel of claim 2, wherein each of the slits has a length of about 10 percent of a width of the first sub-pixel electrode of the third pixel.

9. The liquid crystal display panel of claim 8, wherein an entire area in which the slits are formed is about 10 percent to about 90 percent of an entire area of the first sub-pixel electrode of the third pixel.

10. The liquid crystal display panel of claim 2, wherein the first and second pixels each include a first sub-pixel charged with the first voltage and a second sub-pixel charged with the second voltage, and a voltage ratio of the second voltage to the first voltage in the third pixel is equal to or different from a voltage ratio of the second voltage to the first voltage in each of the first and second pixels.

11. The liquid crystal display panel of claim 10, wherein the voltage ratio of the second voltage to the first voltage in the third pixel is larger than the voltage ratio of the second voltage to the first voltage in the second pixel, and the voltage ratio of the second voltage to the first voltage in the first pixel is equal to or smaller than the voltage ratio of the second voltage to the first voltage in the second pixel.

12. The liquid crystal display panel of claim 11, wherein the voltage ratio of the second voltage to the first voltage in the first pixel is about 0.59 to about 0.845, the voltage ratio of the second voltage to the first voltage in the second pixel is about 0.6 to about 0.85, the voltage ratio of the second voltage to the first voltage in the third pixel is about 0.61 to about 0.9.

13. The liquid crystal display panel of claim 2, wherein the first pixel includes first and second sub-pixel electrodes, and the first and second sub-pixel electrodes of the first and second pixels are disposed on the first substrate, and the first sub-pixel electrode of each of the first, second, and third pixels has a size different from a size of the second sub-pixel electrode of each of the first, second, and third pixels, respectively, and an area ratio of the second sub-pixel electrode to the first sub-pixel electrode in the first pixel is equal to or different from the area ratio of the second sub-pixel electrode to the first sub-pixel electrode in the second pixel.

14. The liquid crystal display panel of claim 1, wherein the area ratio of the second sub-pixel electrode to the first sub-pixel electrode in the third pixel is about 1:1.1 to about 1:3.5, and the area ratio of the second sub-pixel electrode to the first sub-pixel electrode in the second pixel is about 1:1 to about 1:2.5.

15. The liquid crystal display panel of claim 1, wherein each of the first alignment layer and the second alignment layer comprises a polymer material in which decomposition, dimerization, or isomerization occurs when irradiated by a light.

16. A liquid crystal display panel, comprising:
a plurality of pixels, wherein at least one of the pixels includes a first sub-pixel and a second sub-pixel, wherein the first sub-pixel is charged with a first voltage and the second sub-pixel is charged with a second voltage that is lower than the first voltage;
a first substrate comprising a first sub-pixel electrode of the first sub-pixel and a second sub-pixel electrode of the second sub-pixel;
a second substrate facing the first substrate; and
a liquid crystal layer disposed between the first substrate and the second substrate,
wherein each of the first sub-pixel electrode and the second sub-pixel electrode comprises at least two domains having different liquid crystal alignment directions, and the first sub-pixel electrode includes a plurality of slits in at least one of domains and the slits are formed substantially parallel to the liquid crystal alignment direction of the domain in which it is formed,
wherein the pixels comprise a first pixel displaying a red color, a second pixel displaying a green color, and a third pixel displaying a blue color, and the at least one pixel is the third pixel,
wherein the first and second pixels each include a first sub-pixel charged with the first voltage and a second sub-pixel charged with the second voltage, and the voltage ratio of the second voltage to the first voltage in the third pixel is larger than the voltage ratio of the second voltage to the first voltage in the second pixel, and the voltage ratio of the second voltage to the first voltage in the first pixel is equal to or smaller than the voltage ratio of the second voltage to the first voltage in the second pixel.

17. The liquid crystal display panel of claim 16, wherein the first and second pixels each include first and second sub-pixel electrodes disposed on the first substrate, and the area ratio of the second sub-pixel electrode to the first sub-pixel electrode in the third pixel is larger than the area ratio of the second sub-pixel electrode to the first sub-pixel electrode in the second pixel.

18. A liquid crystal display panel, comprising:
a plurality of pixels, wherein the plurality of pixels include first and second pixels displaying a different color from each other, each of the first and second pixels including a first sub-pixel and a second sub-pixel, and each of the first and second sub-pixels includes a plurality of domains, the domains having a different liquid crystal alignment direction from each other,
wherein the first sub-pixel of the first pixel includes a first sub-pixel electrode having a plurality of slits disposed along an edge of the first sub-pixel electrode,
wherein the second sub-pixel of the first pixel includes a second sub-pixel electrode, the first sub-pixel and the second sub-pixel of the second pixel include a first sub-pixel electrode and a second sub-pixel electrode, respectively, and an area ratio of the second sub-pixel electrode of the first pixel to the first sub-pixel electrode of the first pixel is greater than an area ratio of the second sub-pixel electrode of the second pixel to the first sub-pixel electrode of the second pixel.

19. The liquid crystal display of claim 18, wherein a voltage ratio of a voltage applied to the second sub-pixel electrode of the first pixel and a voltage applied to the first sub-pixel electrode of the first pixel is greater than a voltage ratio of a voltage applied to the second sub-pixel electrode of the second pixel and a voltage applied to the first sub-pixel electrode of the second pixel.

* * * * *